May 11, 1948.  G. G. SCHNEIDER ET AL  2,441,228
AUTOMATIC GRID WINDING MACHINE
Filed Aug. 8, 1945   13 Sheets-Sheet 5
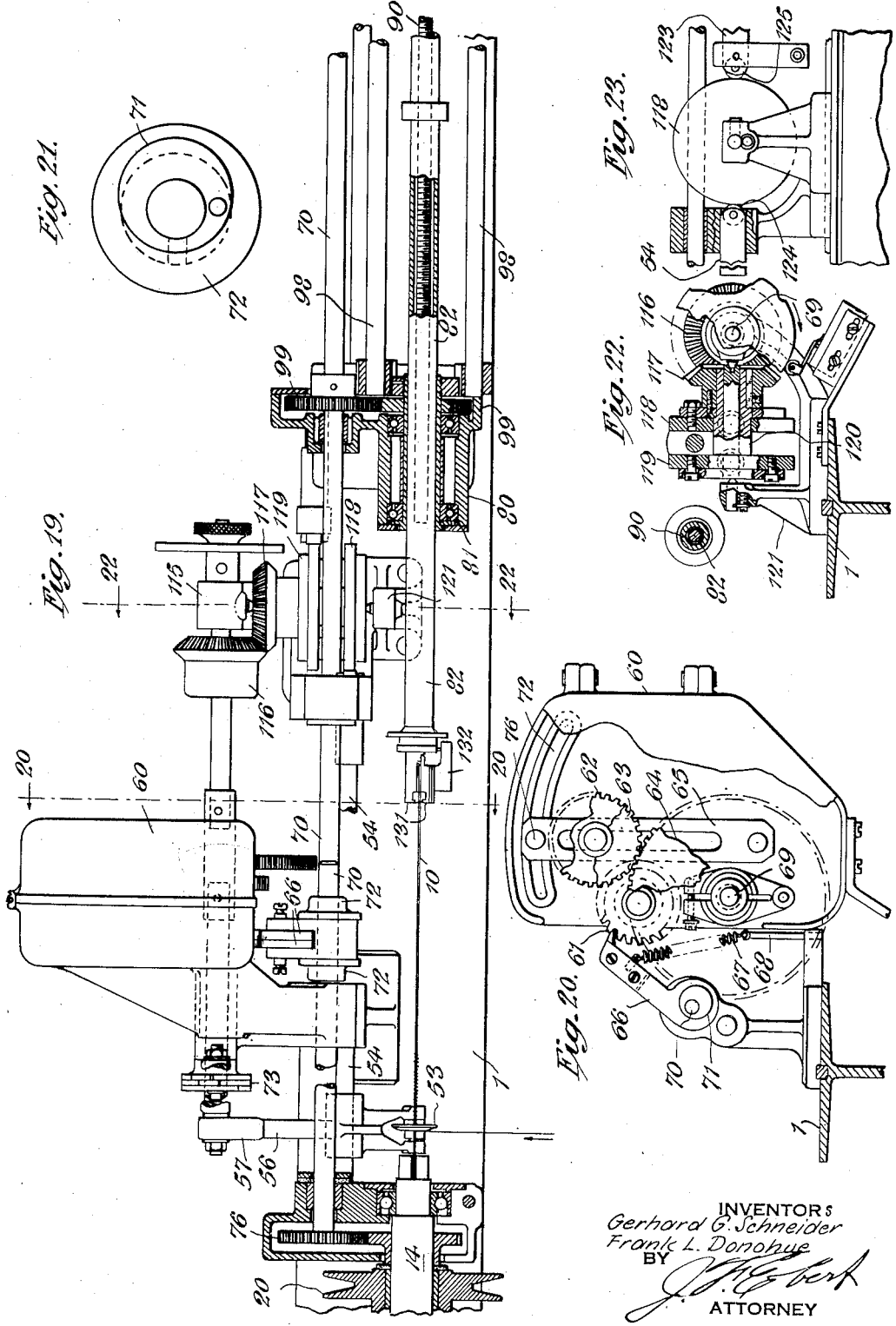
INVENTORS
Gerhard G. Schneider
Frank L. Donohue
BY
ATTORNEY

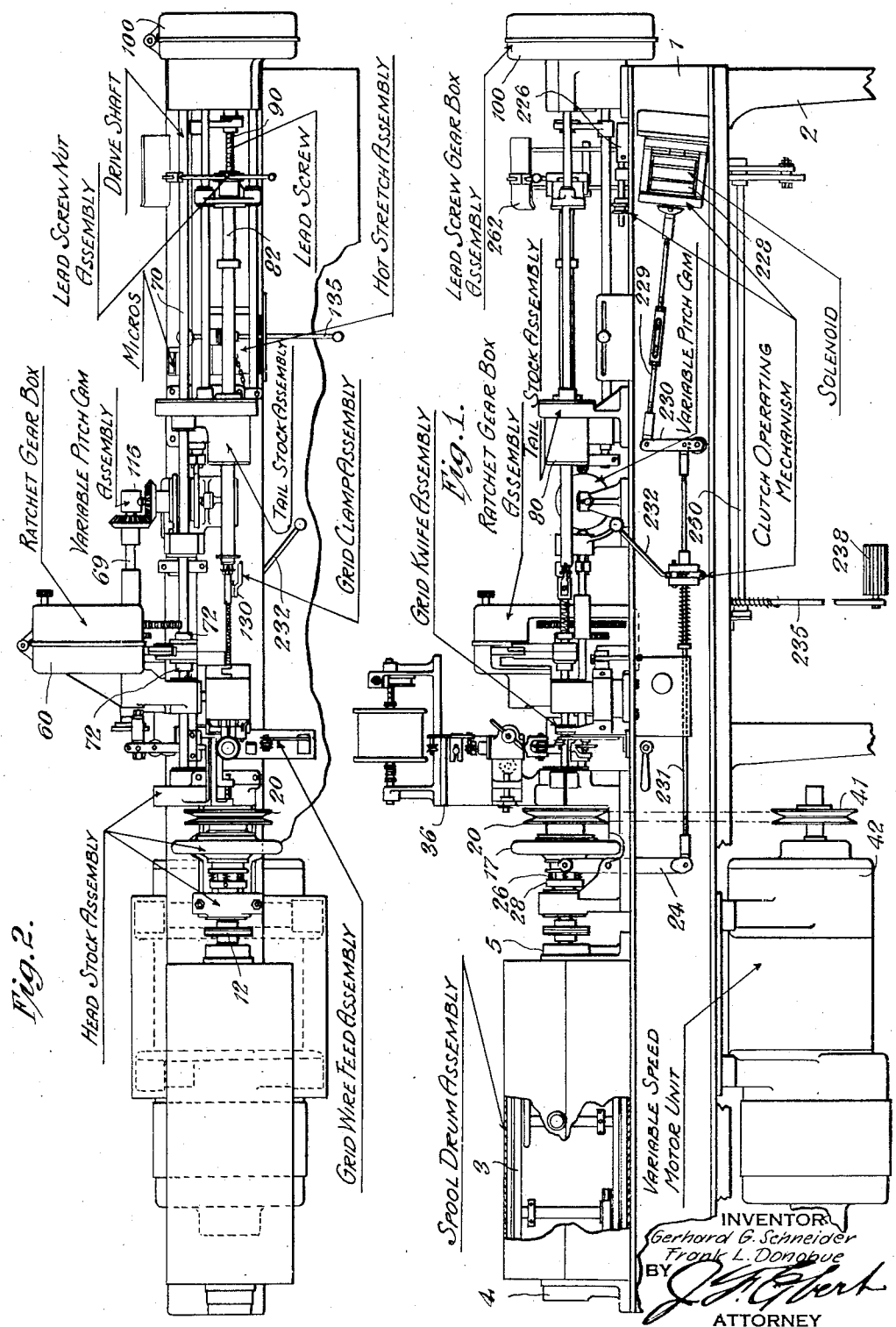

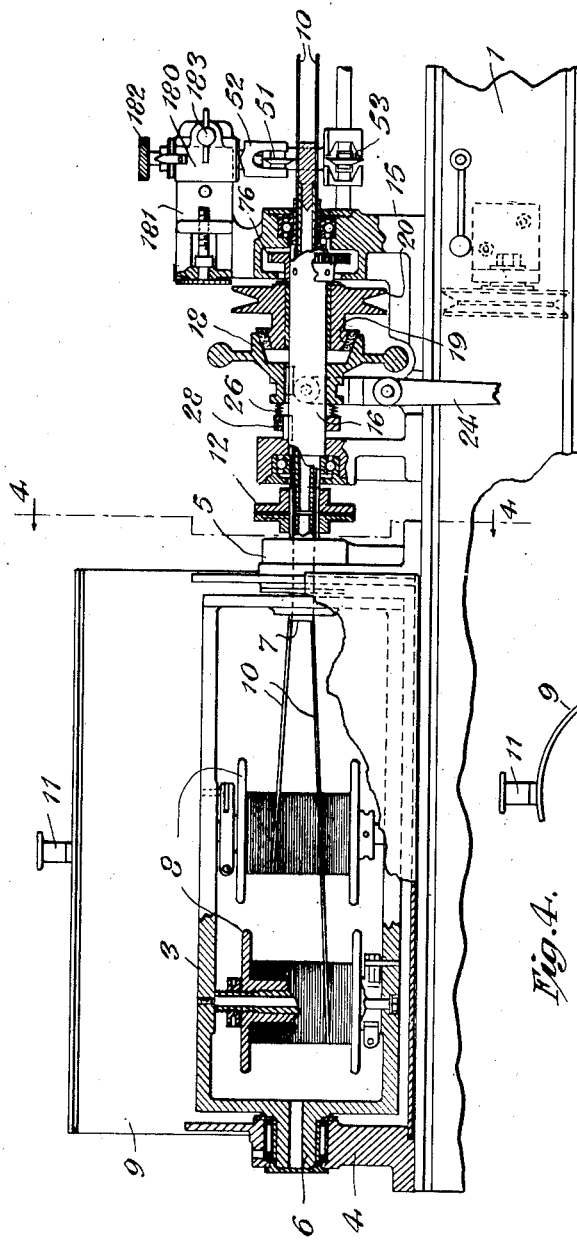

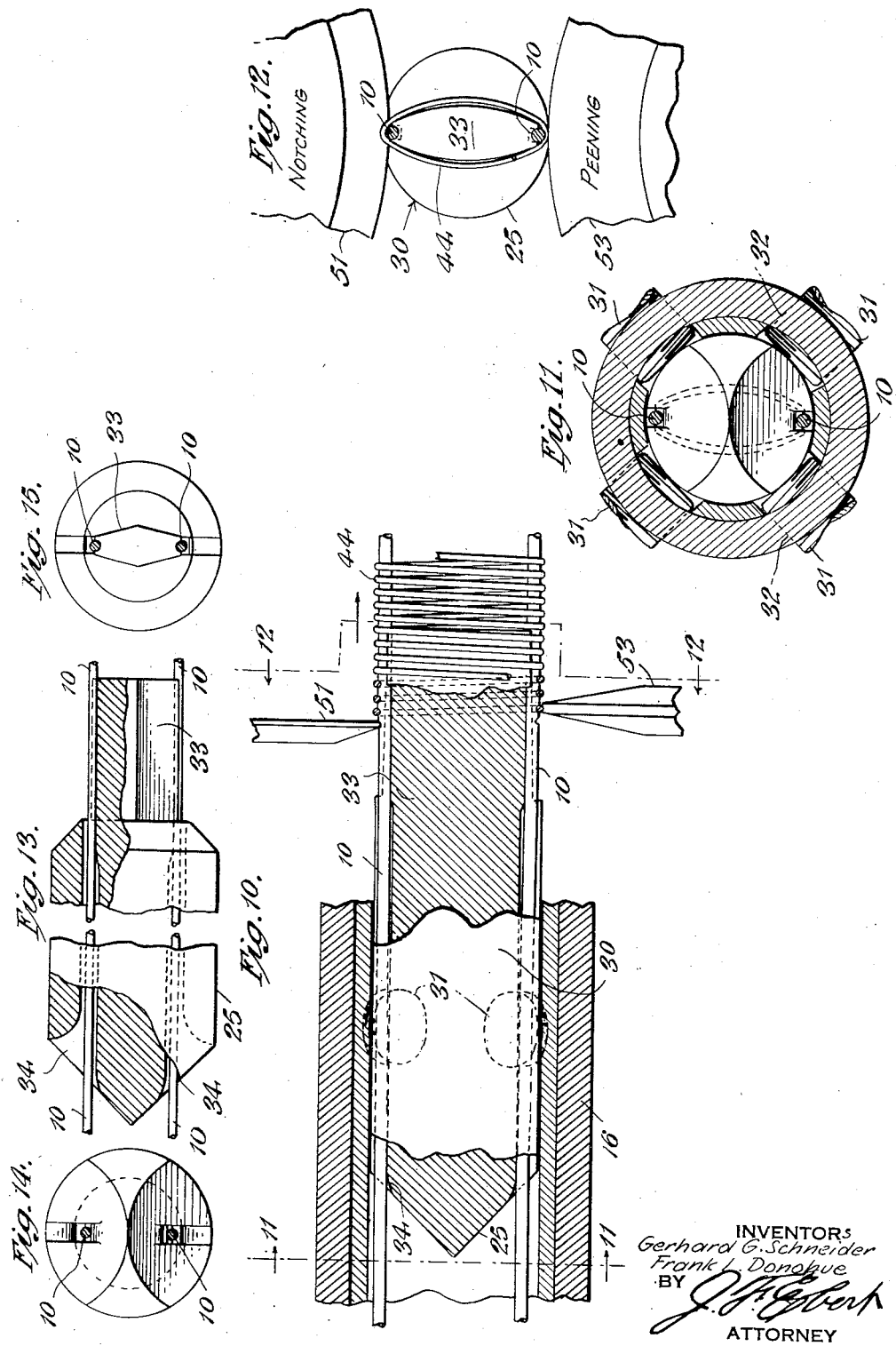

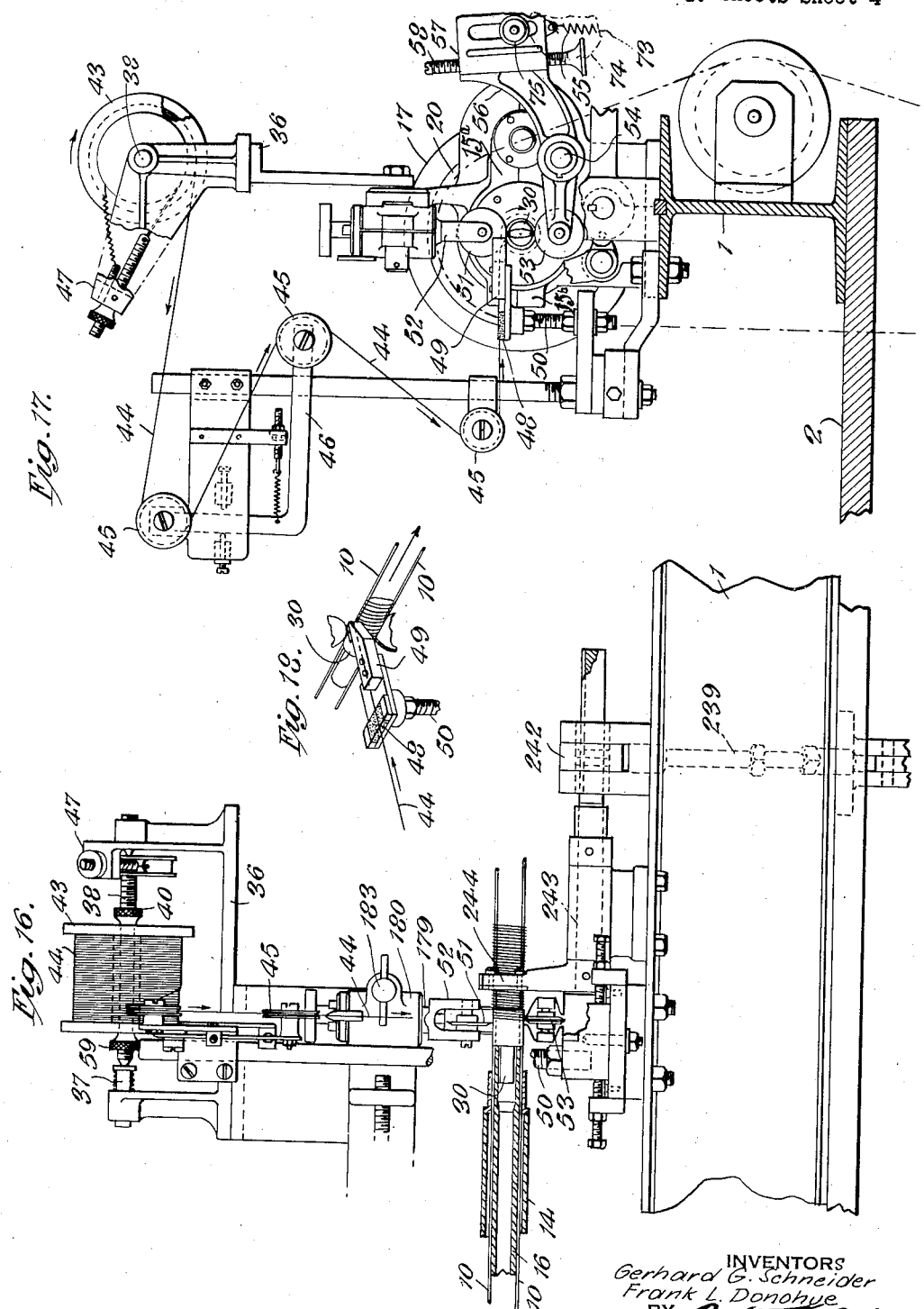

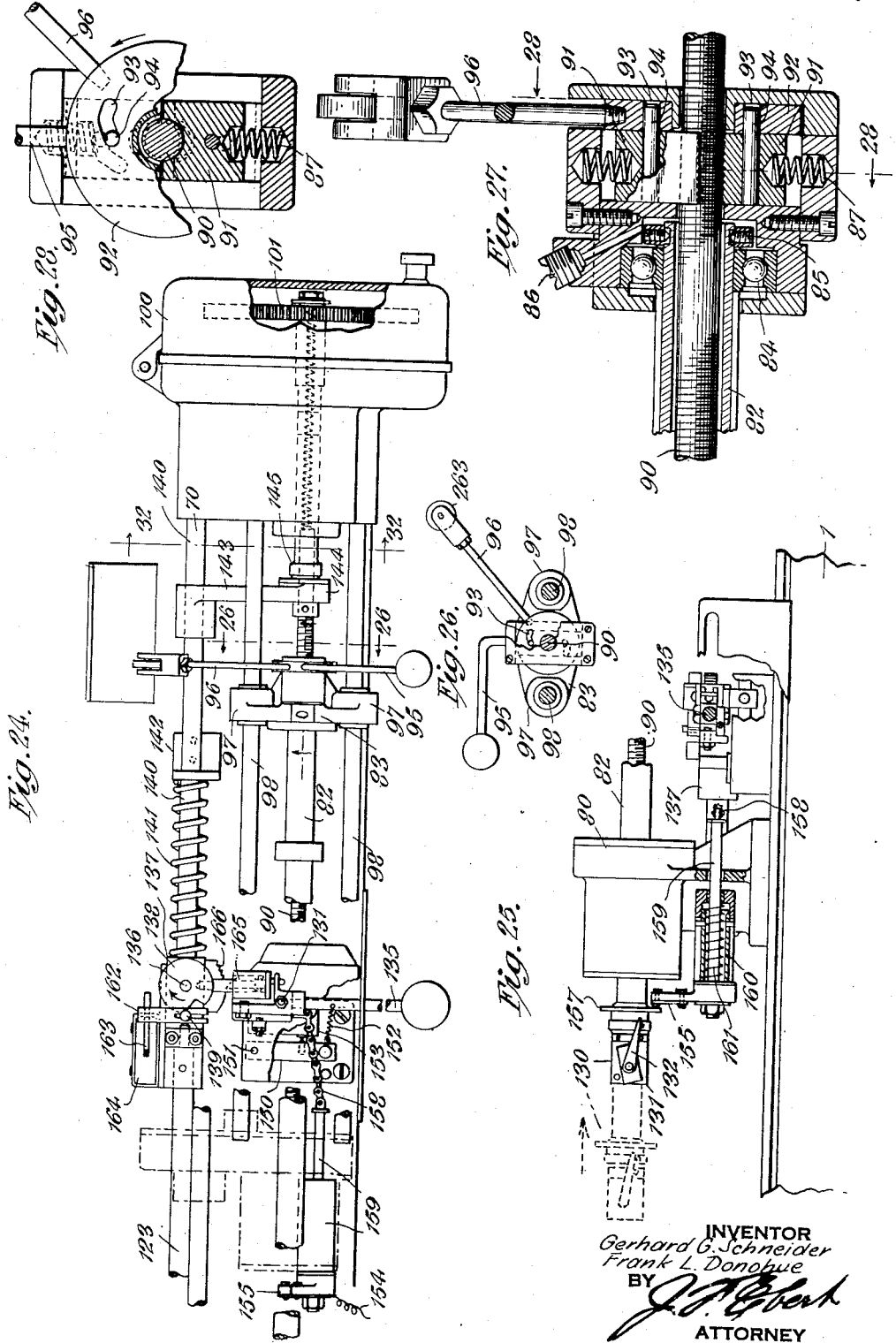

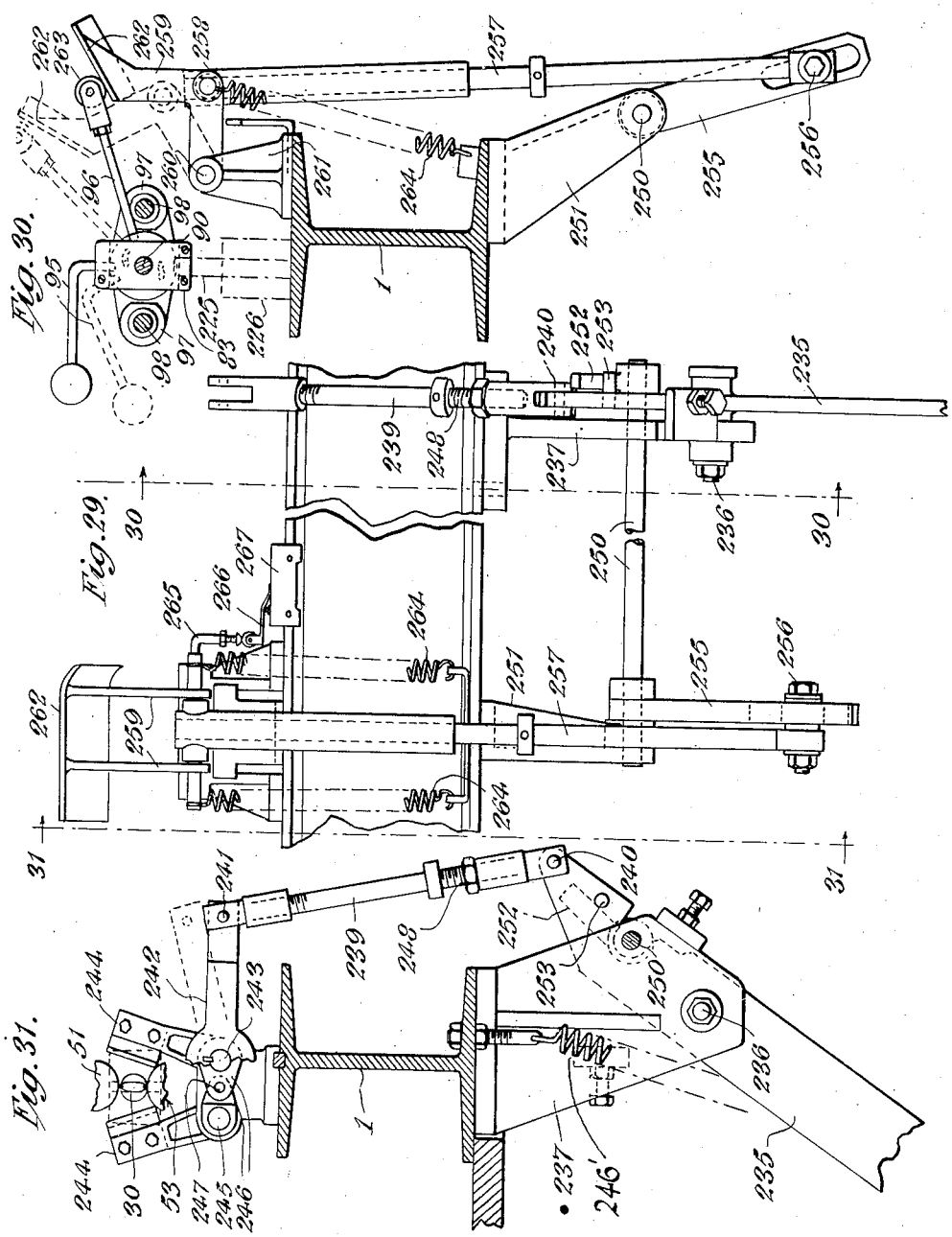

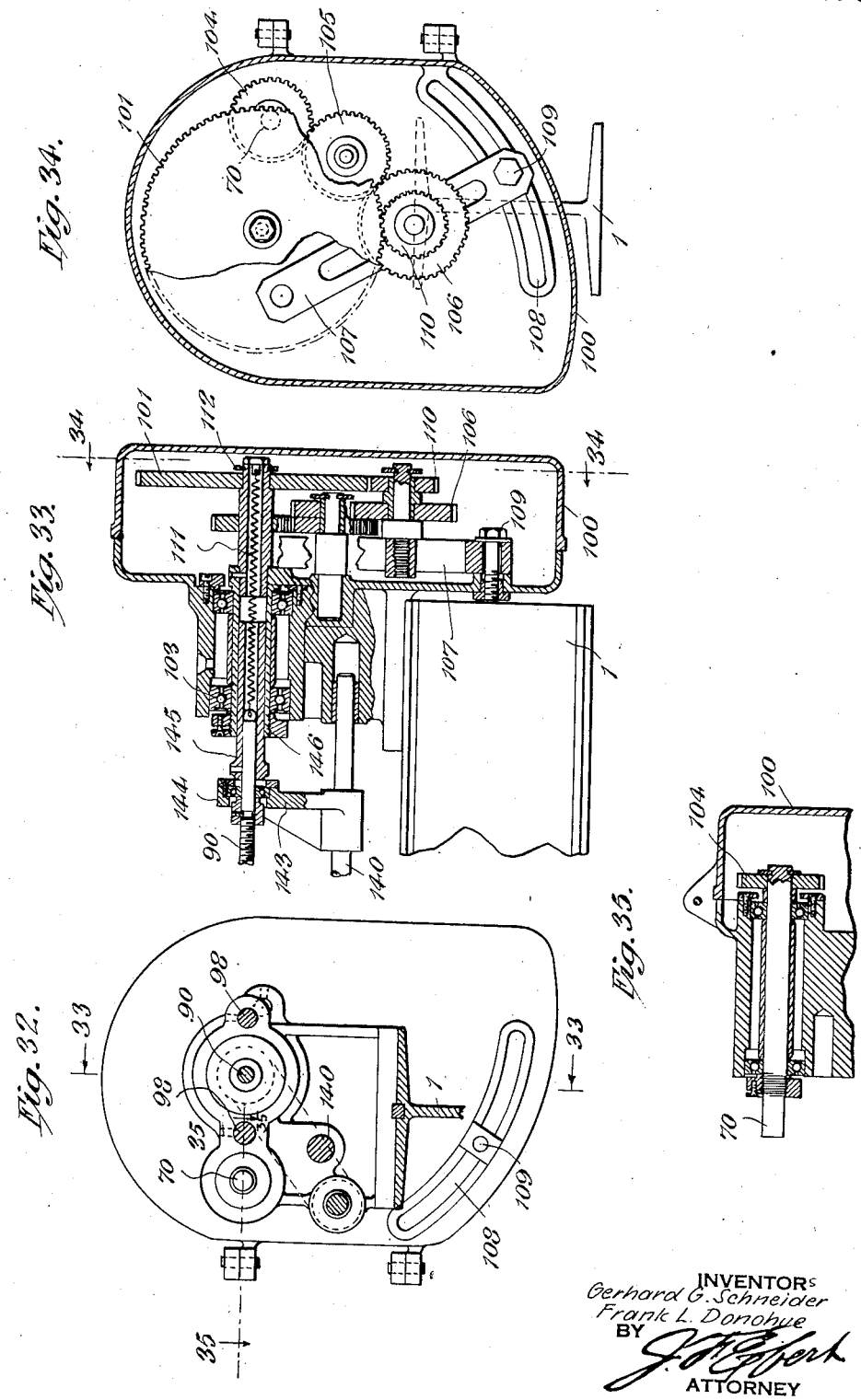

May 11, 1948.    G. G. SCHNEIDER ET AL    2,441,228
AUTOMATIC GRID WINDING MACHINE
Filed Aug. 8, 1945    13 Sheets-Sheet 10
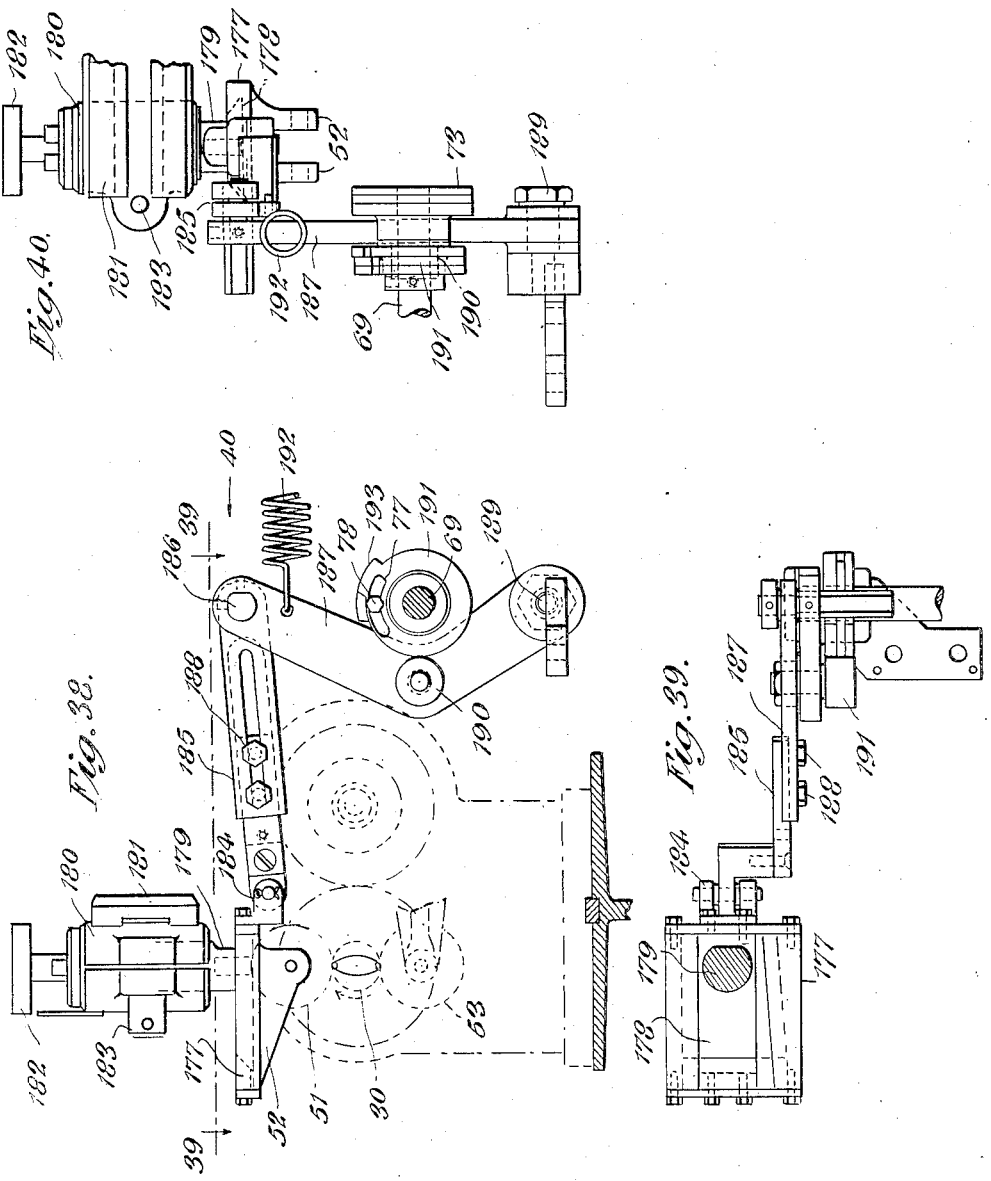
INVENTORS
Gerhard G. Schneider
Frank L. Donohue
BY
ATTORNEY May 11, 1948.  G. G. SCHNEIDER ET AL  2,441,228
AUTOMATIC GRID WINDING MACHINE
Filed Aug. 8, 1945  13 Sheets-Sheet 11
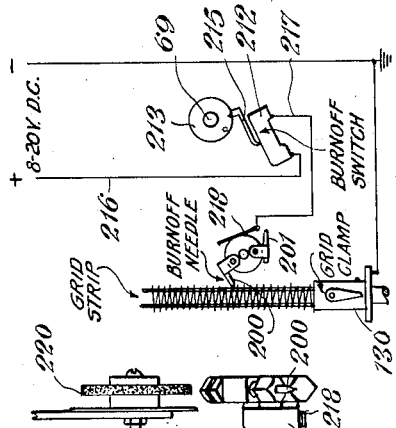
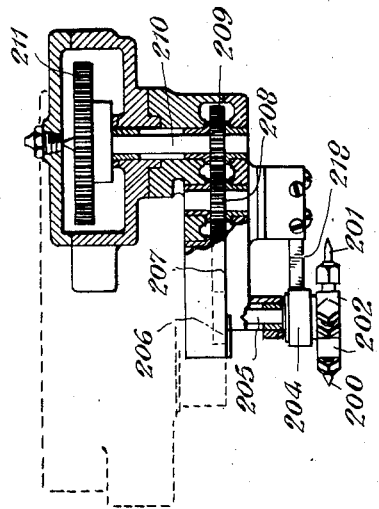
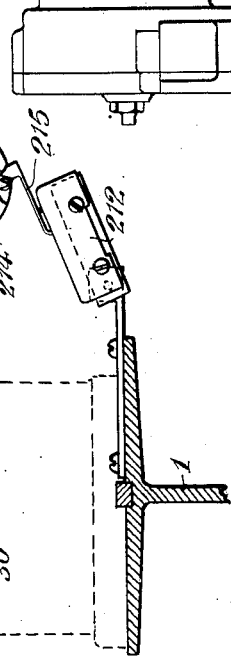
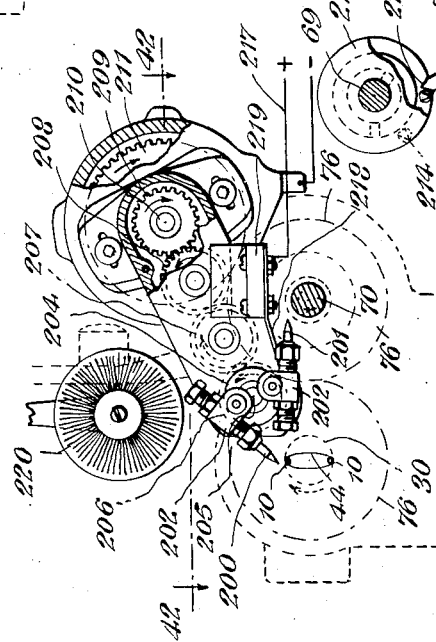
INVENTORS
Gerhard G. Schneider
Frank L. Donohue
BY
ATTORNEY

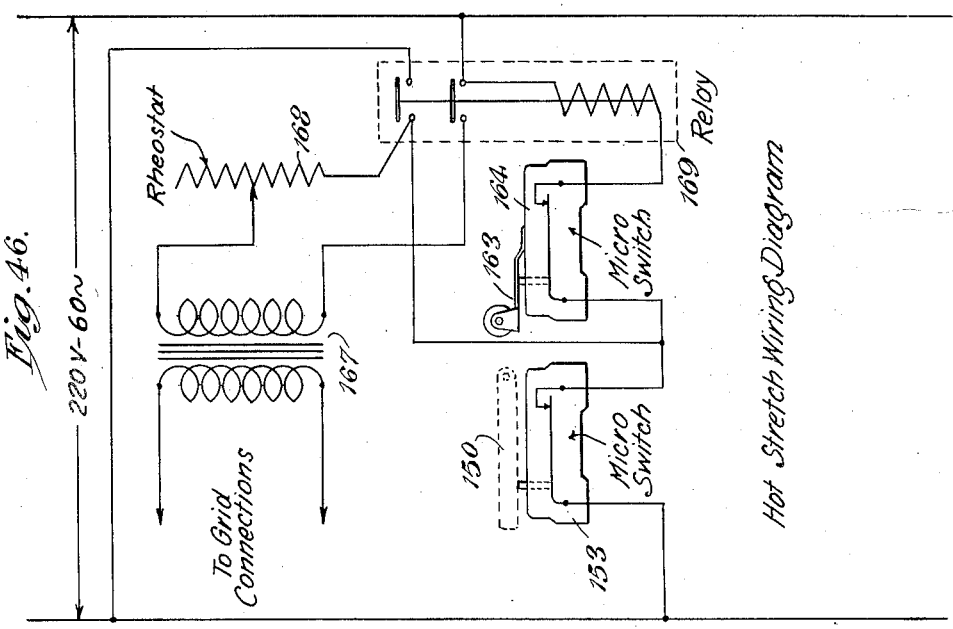
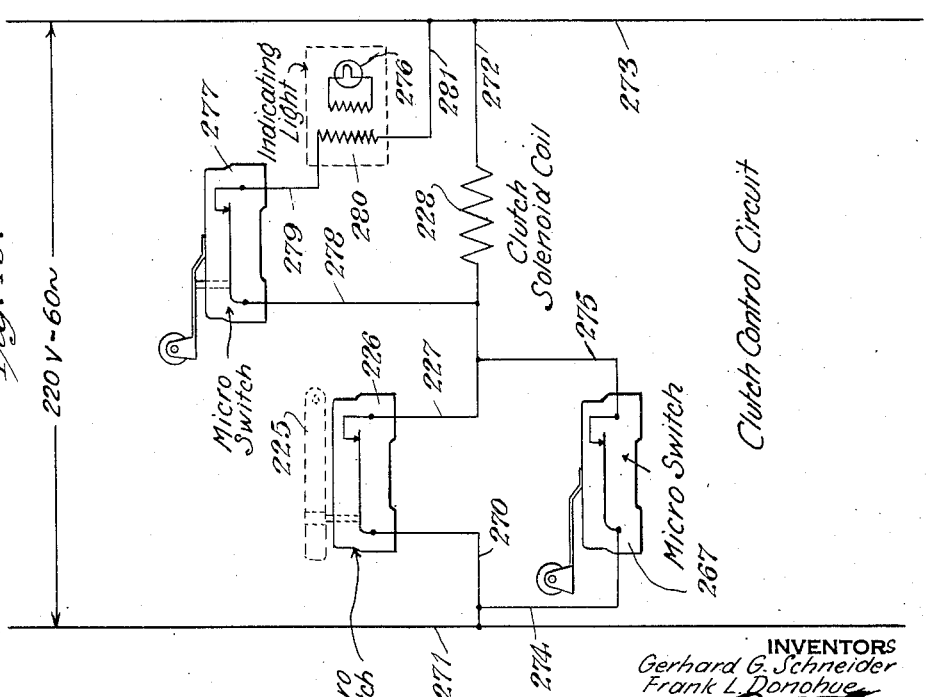

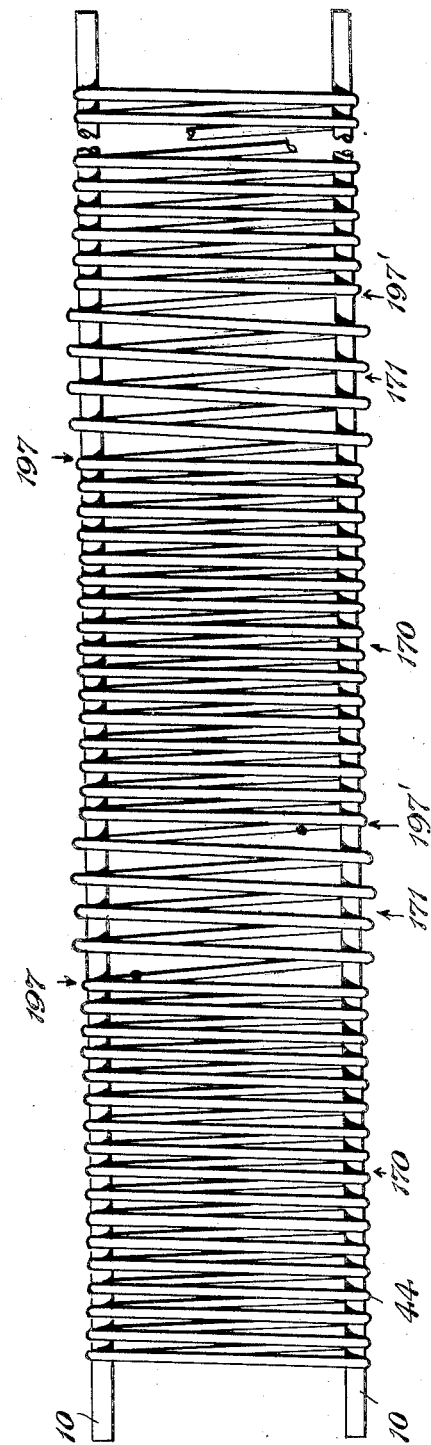
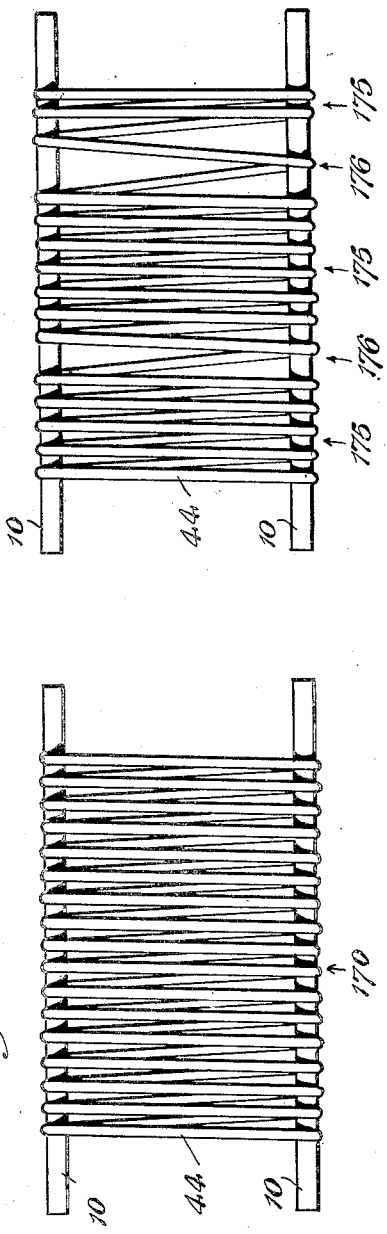

Patented May 11, 1948

2,441,228

UNITED STATES PATENT OFFICE 2,441,228

AUTOMATIC GRID WINDING MACHINE

Gerhard Gunther Schneider and Frank L. Donohue, Maplewood, N. J., assignors to National Union Radio Corporation, Newark, N. J., a corporation of Delaware Application August 8, 1945, Serial No. 609,564

30 Claims. (Cl. 140—71.5)

The present invention relates to an automatic grid winding machine, more particularly one adapted to wind grids of variable pitch.

An object of the present invention is the provision of a grid winding machine in which the sequence of work operations is such as to save time and labor, produce better and uniform quality of product, and effect a reduction in losses of stock materials.

Another object of the invention is to provide a machine capable of producing high precision grids, and grids of more wire turns per inch. Incidental to these features is the production of longer grid strips which materially increases the output of the machine.

Another object is the provision of a grid winding machine composed of separate, self-contained units or assemblies which are so coordinated that the various mechanisms operate in a manner so as to require a minimum of component parts in order to secure a wide variation in the pitch, length and character of the grids.

Another object is the provision of separate mechanisms organized as individual assemblies which may constitute attachments to the main machine and perform characteristic functions. One such function is the winding of loose turns of grid wire by suspending the notching and peening operations for a predetermined length of the grid strip. Associated with this attachment may be a burn out mechanism which automatically severs the loose turns so that they may be easily removed from the grid strip when the latter is cut into sections.

A further object of the invention is the provision of a variable grid winding machine characterized by compactness and simplicity of construction, designed to eliminate wear at vulnerable parts, and also afford a quick change in setup for going from one kind of grid to another, as for example one having a variation in the number of turns and/or length than what the machine may have been previously adjusted to wind.

A still further object of the invention is the provision of a grid winding machine in which most of the operations are performed automatically so the operative's attention may be directed a substantial part of the time to the performance of related duties, but which are independent of the operation of the machine.

Other objects of the invention have to do with details of construction, arrangement of parts, ease of replacement thereof, etc., all of which features cooperate to improve utility, speed of production, quality of product, and other obvious results, which will manifest themselves from a reading of the following description.

The machine contemplated by the present invention comprises units of mechanisms for the winding of grid strips, the characteristics of which may be varied by simple adjustments or changes of component parts of certain of the units. The machine performs the various operations in sequential order and timed relation, so that it is as near self-functioning as possible, whereby continuity of operation substantially approaches the optimum.

More specifically, the invention contemplates a grid winding machine having a spool carrying cradle located at the extreme lefthand end of a machine bed. This cradle may comprise a one-piece casting rotatively mounted upon a spindle through which support wires of the grid strip are fed. Adjacent to the spool drum may be inserted a clutch mechanism which also includes a drive pulley secured to a drive shaft journaled in a head stock. The power source may consist of a variable speed motor suitably connected to the drive pulley mechanism.

Comprising part of the general head stock assembly is a peening and a notching mechanism. Associated with this mechanism is a grid wire feed sub-assembly including tension devices, and a bracket for holding the spool of grid wire. Also cooperatively positioned with respect to the head stock is a grid strip cut-off assembly.

There is provided a lead screw spindle which is driven at the speed of the main drive shaft. Within the spindle is a lead screw, and a lock nut assembly is provided for securing the lead screw to the spindle. The lead screw is adapted to float in the nut assembly which is supported by two floating side bearings sliding on oppositely disposed stationary shafts. The drive shaft arrangement is such that a ratchet gear train controls a cam system interposed between the ratchet mechanism and a lead screw gear box assembly. The ratchet is mounted upon a drive shaft which is also connected to the lead screw spindle; thus the ratchet and the lead screw spindle are operated in unison. The ratchet operates a gear train which rotates a shaft of the cam system at a predetermined speed, but makes one complete revolution per grid. By proper selection of the gears in the ratchet gear box and in the lead screw gear box, variations in the number of turns of grid wire per grid and also variations in the turns per inch, (t. p. i.), may be effected. The lead screw spindle carries a grid clamp which is normally insulated from the machine and adapted to be included in an electrical heating circuit for purpose mentioned hereinafter.

At the completion of the winding of the grid strip, the winding operation is automatically stopped through the release of a lever actuated by a micro-switch. A control circuit arrangement causes current to flow through the grid clamp and the grid strip. This heats and effects the automatic stretching of the grid strip, the operation being generally referred to as "hot stretching," the purpose being to relieve any strains produced in the grid strip by the winding operation.

For making changes in the length, and also the turns per inch, of the grid, the cross section thereof, etc., several unitary mechanisms are provided. For example, the length of the grid having a given number of turns per inch, may be adjusted by a quick change of gears in the ratchet and the lead screw gear trains, which are operatively related to each other through an interposed cam system.

The cross section of the grid may be determined by the proper selection of a mandrel inserted in the nose of the head stock spindle. The notching or no-notching of the grid support wires is controlled automatically. A burn-off mechanism may be provided for automatically burning off the grid wire at the start and termination of the loose turns so as to relieve the operative of the necessity of cutting away such loose turns as was the practice heretofore.

A more complete understanding of the invention will be had as the description proceeds. Referring to the drawings in which a preferred form of the invention is illustrated;

Fig. 1 is a side elevational view, showing the general assembly, with parts broken away, of a grid winding machine, embodying my invention;

Fig. 2 is a plan view of Fig. 1;

Fig. 3 is a sectional detail of the spool carrying cradle, drive clutch, head stock and notching and peening device;

Fig. 4 is a section on the line 4—4 of Fig. 3;

Fig. 5 is an enlarged longitudinal sectional view, on the line 5—5 of Fig. 7, of the head stock spindle showing the support wires guided therein;

Fig. 6 is a section on the line 6—6 of Fig. 5;

Fig. 7 is a section on the line 7—7 of Fig. 5;

Fig. 8 is a section on the line 8—8 of Fig. 5;

Fig. 9 is an end view of Fig. 5 as viewed from the right;

Fig. 10 is a greatly enlarged view, partly in section, of the grid mandrel, notching, and peening wheels, and the grid wires;

Fig. 11 is a section on the line 11—11 of Fig. 10 showing the method of supporting the grid mandrel in the head stock spindle;

Fig. 12 is a section on the line 12—12 of Fig. 10 showing the notching and peening wheels in relation to the grid mandrel and supported wires;

Fig. 13 is an enlarged detail of an alternative form of grid mandrel;

Fig. 14 is an end view of Fig. 13 as viewed from the left;

Fig. 15 is an end view of Fig. 13 as viewed from the right;

Fig. 16 is a detail of the grid wire assembly in relation to the head stock, notching and peening wheels, and knife cut-off;

Fig. 17 is a side view of the grid wire assembly;

Fig. 18 is a perspective view of the grid wire guide;

Fig. 19 is a plan view of variable pitch cam assembly and associated parts;

Fig. 20 is a section on the line 20—20 of Fig. 19, showing details of the ratchet gear box, parts broken away;

Fig. 21 is a side elevational view of the eccentric arrangement for operating the ratchet pawls;

Fig. 22 is a section on the line 22—22 of Fig. 19, showing in particular the variable pitch cam assembly;

Fig. 23 is a side view of Fig. 22;

Fig. 24 is a plan view showing hot stretch, lead screw, lock-nut assembly and lead screw gear box assembly;

Fig. 25 is a side elevation including the hot stretch device and parts of the tail stock assembly, parts being broken away;

Fig. 26 is a section on the line 26—26 of Fig. 24 showing the lock nut assembly;

Fig. 27 is an enlarged sectional view of the lock-nut and lead screw;

Fig. 28 is a section on the line 28—28 of Fig. 27;

Fig. 29 is a rear view of the means for releasing the lock-nut and also for operating the cutting knives;

Fig. 30 is a section on the line 30—30 of Fig. 29 showing in dotted lines the release of the lock-nut;

Fig. 31 is a section on the line 31—31 of Fig. 29 showing the cut-off knife operation in dotted lines;

Fig. 32 is a section on line 32—32 of Fig. 24, as viewed from the left;

Fig. 33 is a vertical sectional view of the lead screw gear box assembly, taken on line 33 of Fig. 32;

Fig. 34 is a section on the line 34—34 of Fig. 33;

Fig. 35 is a section on the line 35—35 of Fig. 32;

Fig. 38 is a side elevation, partly in section, with associate parts, of the no-notching mechanism;

Fig. 39 is a sectional plan view, on the line 39—39 of Fig. 38;

Fig. 40 is an elevational view of Fig. 38, in the direction of the arrow 40, of the no-notching mechanism illustrated in Fig. 38;

Fig. 41 is a transverse sectional view of the burn-off mechanism;

Fig. 42 is a section, taken on the line 42—42 of Fig. 41;

Fig. 43 is an elevational view, looking from the left of Fig. 41;

Fig. 44 is a schematic wiring diagram of the burn-off circuit arrangement;

Fig. 45 is a wiring diagram of the clutch control circuit connecting driving power to the machine;

Fig. 46 is a wiring diagram of the hot-stretch circuit forming part of the hot-stretch assembly;

Fig. 47 is an elevational view on a large scale of a grid strip as it comes from the machine, the intermediate portions thereof being broken out;

Fig. 48 is an elevational view of an individual grid, the grid wires all having the same pitch; and Fig. 49 is an elevational view of an individual grid in which some of the grid wires have a variable pitch.

Figure 36:
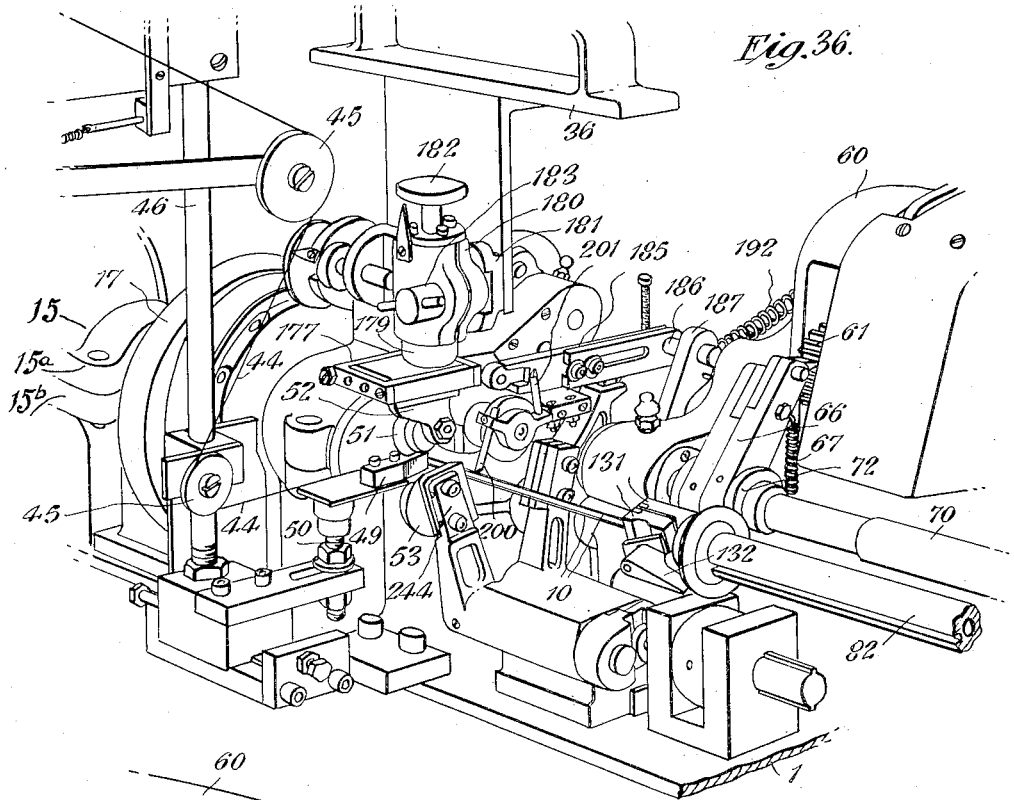
Fig. 36 is a front perspective view showing the location and general construction of the notching mechanism and loose wire burn-off attachment.

From the above it is obvious that a machine embodying the present invention is composed of a number of separate units which are operated in sequence, thus producing a flow of operations. For the sake of convenience certain of these units or sub-assemblies will be described in their entirety and, wherever feasible, in the order in which they function. In that manner the operations of the machine will unfold itself so that a brief general description will suffice to make clear how the machine may be continuously operated and variations in the characteristics of the grid effected.

In describing the machine, for the sake of convenience in identifying the several assemblies and sub-assemblies, legends are applied to Figs. 1 and 2 because these figures illustrate the main machine assembly; by identifying these assemblies with legends the location and/or arrangement thereof is more easily appreciated. Throughout the drawings corresponding reference characters are applied to corresponding parts but wherever space permitted, legends are also used to indicate important elements in the main combination of the several units.

Referring particularly to Figs. 1 and 2 of the accompanying drawings, it will be noted that the machine bed or chassis consists of a sturdy I beam 1 of sufficient length to permit the parallel mounting thereon of the various castings for the several machine units. For the purpose of alignment and to facilitate the mounting of the units, the I beam is provided with a centrally arranged longitudinal keyway. This permits the sub-assemblies to be keyed to the center keyway over the entire length of the machine bed 1.

The machine bed 1 may be mounted upon the top of a table 2 which table may take the form of a cabinet having side drawers (not shown) for tools, parts and grid trays which are accessories of the machine.

At the extreme left-hand end of the machine there is provided a spool drum assembly including a cradle 3, preferably a one-piece steel casting, journaled in support members 4 and 5 having needle bearings (see Fig. 3). The journal for the bearing 4 may comprise a hub 6 formed integrally with the cradle 3 while the journal for the bearing 5 may consist of a spindle 7, having a center bore and provided with oppositely disposed peripheral grooves, so that the grid support wires 10 may be lead from the spool drum assembly, as hereinafter more fully described. The outer end of the spindle 7 has secured thereto one face of a flexible coupling 12, which coupling connects the spool drum assembly to a source of power as presently described.

Mounted laterally in the cradle 3 are spools 8 of grid support wires 10, which spools may be rotatively supported by any conventional means permitting adjustment laterally; said means in itself forming no part of the present invention. The spool drum may be provided with a hinged cover 9, preferably transparent, to afford protection and visibility while the cradle 3 is rotating. For the convenience of opening and closing of the cover 9, a knob 11 is secured thereto.

A head stock assembly is mounted adjacent the spool drum assembly and has associated with it several sub-assemblies which are coordinated and perform sequential operations that make the general head stock assembly, including its associated assemblies, an important part of the machine.

The head stock may be of any conventional design including a base having formed integrally therewith upright members 15 provided with roller bearings into which is fitted a spindle 16. The head stock spindle 16 (see Figs. 5 to 9) is provided with a sleeve 14 having brazed or otherwise secured to the ends thereof sleeves 21 which are of reduced diameter or stepped down to provide bearing surfaces when the spindle is mounted in the head stock. The ends of the spindle 16 extend beyond the ends of the head stock and the right-hand end of the spindle is provided with a socket or nose portion 13 adapted to receive a mandrel 30. The spindle 16 has oppositely disposed longitudinal grooves 27 for accommodating the support wires 10 which are fed from the spools 8. These grooves are used in feeding the grid support wires when the grid strip is of substantial width, but for the smaller sized grids the support wires 10 may be threaded through the hollow core provided in the spindle 16. This permits the use of large and small support wires, widely and closely spaced, respectively.

The grid mandrel 30, having a steel shank 25 and a tungsten tip 33, is inserted in the socket or nose 13 of the spindle 16 and is secured in place by suitable locking members. These locking members may take the form of stud screws 31 mounted in threaded apertures 32 and adjustable therein in any suitable manner, as for example having a countersunk recess in the head of each screw adapted to be engaged by a wrench so that the screw members 31 may be moved inwardly or outwardly with respect to the axis of the mandrel 30. This arrangement provides a close fit between the mandrel 30 and spindle 16, yet allows sufficient adjustment by means of the screws 31 to align properly the mandrel within the spindle.

The tip end 33 of the mandrel is shaped to conform to the configuration of the grid; in cross-section it may be oval-shaped as shown in Fig. 12 or diamond-shaped as shown in Fig. 15, depending upon the type of grid it is desired to wind by a given setting of the machine. It is obvious that the size and shape of the mandrel tip 33 determines the configuration of a given grid; also, that the mandrel 30 may be easily and quickly changed when desired.

By reference to Figs. 10 to 15 it will be noted that the rear end of the mandrel 30 is bevelled and the apertures 34, through which the support wires 10 are led through the shank 25 of the mandrel, are provided with flares in order to facilitate the feeding of the support wires through the mandrel openings; further the edges of the mandrel tip are provided with grooves suitable to accommodate the support wires and the tip also functions as an anvil during the notching and peening operations.

On the left-hand end of the spindle 16 is mounted the opposing face of the flexible coupling 12 whereby connection is made between the spindles 7 and 16. A hand wheel 17 is carried by the spindle 16 and is provided with a truncated cone-shaped recess 18 adapted to engage with a complementarily formed frictional surface 19 on a pulley 20. The surfaces 18 and 19 provide clutching means for transmitting power to several of the various assemblies including the spool cradle 3. The hand wheel 17 is secured to the spindle 16 by a sunk oblong keyseat (see Fig. 5). This arrangement permits reciprocation of the wheel 17 on the spindle 16 by a forked member 24, which is suitably pivoted on the head stock 15 and actuated by a clutch operating mechanism hereinafter to be described. The forked member 24 engages a grooved extension on the hub of the hand wheel 17, the engagement being effected by suitable pin or finger members which normally idle in the groove while the hand wheel 17 is rotating. For normally keeping the clutch surfaces 18 and 19 in engagement a plurality of compression springs 26 are provided. These springs are confined between a rotatable collar 28 and the hub of the hand wheel 17. A driving belt passes over the pulley 20 and another pulley 41 which is driven by the variable speed motor 42.

Operatively positioned with respect to the mandrel 30 is a grid wire feed assembly (see Figs. 16 to 18). This assembly includes an over-head bracket 36 suitably mounted on top of the head stock and comprising oppositely disposed supports having bearings for shaft members 37 and 38 between which is suspended an adjustable arbor terminating in cone-shaped bearings 39 and 40. A spool 43 of grid wire 44 may be properly positioned with relation to a guide system comprising idlers 45 supported upon a rack member designated generally by the reference character 46, and including fastening and tensioning means (see Fig. 17). To prevent over-running of the spool 43 which may be caused by a change in speed of operation, an adjustable resilient braking device 47 (see Figs. 16 and 17) is provided which may be of any conventional form that permits a change in tension of a brake band, and consequent change in braking power applied to the spool 43. The foregoing arrangement provides an over-head feed for the grid wire, thus keeping it out of the operative's way.

The grid wire 44 is fed from the spool 43 through the wire feed idlers 45, over a pad member 48 (see Fig. 18) of felt or the like and past a guide finger 49 onto the grid support wires. By having the pad 48 of absorbing material, means are thus provided for lubricating the grid wire as it is fed past the guide finger 49 which for the sake of durability is made of tungsten or provided with a tungsten tip. Since the support wires 10 move from left to right with respect to the guide finger 49 the grid wire 44 is thus maintained in contact with the finger 49. For regulating the height of the pad 48 and guide finger 49, with respect to the support wires 10, an adjustable bracket construction 50 (see Fig. 17) is provided, the manipulation of which is obvious to those skilled in the art.

As forming part of the general head stock assembly are notching and peening devices whereby the respective support wires 10 are first notched, the grid wire inserted in said notches and then peened to the support wire. The construction of the notching and peening devices may be best understood by referring to Figs. 10, 12, 16 and 17. A notching wheel 51 is carried by a bifurcated bracket member 52 which is adapted to be actuated by a cam construction (hereinafter more fully described) so as to engage and disengage the support wires 10. In a somewhat similar manner the peening wheel 53 is mounted oppositely the notching wheel 51 but in staggered relation thereto; i. e., the notching wheel 51 being slightly in advance of the peening wheel 53 and the grid wire 44 being fed therebetween, so that the sequence of operations relative to these members is notching and peening.

Figure 37:
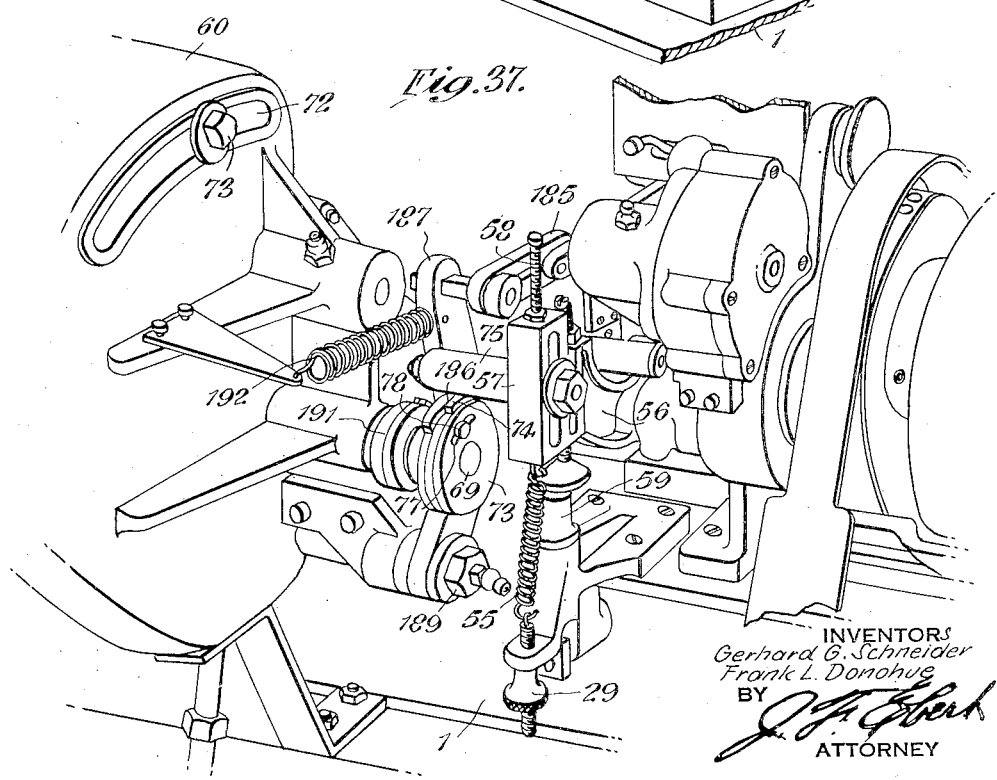
Fig. 37 is a rear perspective view showing principally the cam system for operating the no-notching, cutting and peening mechanism.

An arcuate-shaped lever 56 (see Figs. 17 and 37) is pivotally mounted by means of a shaft 54 on the back of the machine bed 1 and the peening wheel 53 is supported from one arm of the lever 56 while the other arm thereof is provided with an adjustable mechanism that includes a block member 57 carrying a screw member 58 terminating in a cone-shaped base, the member 58 being adjustable vertically in the block member 57 by a thread arrangement so that the peening wheel 53 may be operatively positioned with respect to the mandrel 30.

That is to say, the downward movement of the block member 57 is limited by the adjustment of screw 58, the lower end of which engages a suitable stop 59 (see Fig. 37) and is maintained in contact therewith by a tension spring 55. This arrangement retains the proper adjustment of the peening wheel with respect to the grid mandrel 30 so that when the size of the mandrel is changed, or loose turns added or removed, the peening wheel 53 may be suitably adjusted to meet such changes. The member 57 is actuated by a cam 73 secured to the cam shaft 69 and having a rise 74 that contacts a cam roller 75 carried by the member 57. When the roller 75 engages the cam rise 73 the peening wheel 53 is moved so as to disengage the support wires 10, thus omitting periodically the peening operations for reasons hereinafter apparent. The adjustment of the cam roller 75 and also the screw member 58 is sufficiently elastic to permit the use of a considerable range in the size and shape of the mandrel 30. The tension of the spring 55 is sufficient to hold effectively the peening wheel 53 against the support wires 10 during the peening operation. To insure the proper tension on the spring 55, an adjusting screw element 29 is attached to the lower end of said spring and by manipulation of the screw 29 any desired tension of the spring 55 may be secured.

It will of course be understood that for making continuously wound grid strips the notching wheel 51 and the peening wheel 53 are constantly in operative position with respect to the support wires 10 and when thus functioning there is no variation in the pitch of the grid or any loose turns provided; i. e., the grid strip is continuously wound with tight turns having no variation in pitch. To obtain variation in pitch, as well as winding loose turns, cam operated assemblies or attachments are brought into service as hereinafter explained.

A ratchet gear box assembly is mounted to the right, and rearwardly of the notching and peening devices (see Figs. 19 and 20). The gear box proper may be a conventional two-piece inclosure 60, one section of which is hinged to the other and the unhinged section is provided with a bracket supporting arm attached to the machine bed 1. Mounted within the gear box 60 is a train of gears. The gear train includes a double ratchet 61 suitably meshed with an intermediate gear 62; carried on the same shaft is a second intermediate gear 63, which in turn meshes with a driven gear 64. The intermediate gears 62 and 63 are carried by a linkage construction comprising a slotted link member 65, pivoted at its lower end and having its upper end movable in an arcuate race 72. Any sort of suitable fastening means, such as a bolt 73, secures the link 65 in an adjusted position. The slot in the link 65 permits the longitudinal movement of the gears 62 and 63 with respect to said link, so that any size intermediate gears may be mated with the ratchet 61 and the driven gear 64, by pivotally adjusting the link 65 and also moving the gears 62 and 63 with respect to the slot in said link 65.

The ratchet 61 is driven by an arrangement of double pawls 66 which are mounted exteriorly of the gear box 60. For operating the pawls 66 so as to rotate the ratchet 61 in a clock-wise direction, we provide a double eccentric construction mounted upon the shaft 70, said construction including a pair of eccentrics 71 individually arranged with respect to the double pawls 66; the eccentrics 71 are substantially disposed at 180 degrees on the shaft 70. Flanged collars 72 (see Fig. 19) suitably secured to the shaft 70, are positioned against the outer surfaces of each of the eccentrics 71, whereby the pawls 66 are maintained in operative relation with respect to the eccentrics 71. The several pawls 66 are maintained in engagement with the ratchet 61 by a tension spring 67 (see Fig. 20) one end of which is fastened to the pawl arm and the other end to an anchor member 68. The shaft 70 is driven from the spindle 16 by gearing indicated at 76 in Figs. 3 and 19.

From the foregoing, it will be seen that as the shaft 70 rotates, the eccentrics 71 alternately move the arms of the pawls 66 upwardly, thus rotating the ratchet 61, a notch at a time for each upward movement of each pawl, and by the sequence of operation of the two pawls 66, the arm of one reaches the end of its stroke while the arm of the other pawl is at the lower end of its stroke. By this arrangement, the ratchet 61 is actuated step by step, and by selecting the proper set of change gears the cam shaft 69 may be rotated at a predetermined R. P. M., which shaft in turn controls the number of total turns (loose and tight) per grid, as will presently be explained. It is important to note in passing that by adding the quick change gear box to the double pawl ratchet feed, any number of turns per grid from 5 to 250, can be secured by changing the gears without changing the ratchet which eliminates many costly ratchets.

A tail stock assembly comprising a tail stock 80 (see particularly Figs. 1, 2, and 19) mounted on the machine bed 1 in any suitable manner is provided with anti-friction bearings 84, preferably ball bearings, to allow for take up to eliminate any end play of a lead screw spindle 82 which is journaled therein. The spindle 82 is reciprocally mounted with respect to the machine bed 1, and is moved forwardly (to the left) manually and backwardly (to the right) automatically by being locked to a nut assembly comprising a lock box referred to generally by the reference character 83 (see Fig. 24). The lock nut box 83 constitutes a housing for the lock nut assembly parts including a ball bearing 84 for journaling the right hand end of the lead screw spindle 82. The end of the spindle 82 extends through the bearing 84, and carries thereon a collar 85, which may be secured by set screws adapted to fit threaded apertures in the collar 85 and engage holes provided in the spindle 82. This construction permits the spindle 82 to rotate in the bearings 81 and 84, independently of a lead screw 90 which is concentric with the spindle 82 and has one end thereof mounted in a gear box 100, hereinafter described. Incidentally, it may be noted that a lubricating member 86 is provided for lubrication of the bearing 84, said member being one of a pressure fitting system with which the machine is equipped for uniform lubrication.

By a lock nut construction mounted in the box 83 (see Figs. 26 to 28), the spindle 82 may be locked to the lead screw. The essential characteristics of the lock nut mechanism may comprise a pair of split lock nuts 91 which are opened and closed by a cam 92 provided with slots 93 arranged to accommodate pins 94. The cam 92 is controlled manually by hand lever 95 and automatically by lever 96. The lock nuts 91 and lead screw 90 are threaded exactly alike and there is one thread on the lead screw for each turn per inch. The lock nuts 91 when closed are held in engagement with the lead screw 90 by means of compression springs 87.

By this arrangement the lead screw 90 is adapted to float in the lock nut box 83, which latter is supported by two floating side bearings 97, sliding on oppositely disposed stationary shafts 98. The lead screw spindle 82 is driven at the speed of the drive shaft 70 by means of a pair of speed gears 99 having a ratio of unity and housed within the tail stock 80 (see Fig. 19). Since the lead screw 90 has a floating connection with the spindle 82, these members may be driven at different speeds, the purpose of which will hereinafter be explained. It is obvious, however, from the above that as the lead screw 90 revolves, the lock nut assembly rides unidirectionally from one end of the lead screw to the other, thus carrying the spindle 82 away from the mandrel position.

A coil type tension spring 111 (see Fig. 33), having one of its ends secured to the right-hand end of the lead screw 90 and its other end attached to an adjusting nut 112, is carried on the end of the spindle 102. By this means, the lead screw 90 is normally tensioned toward the gear box 100 so that, in a subsequent operation hereinafter described, the lead screw 90 is pulled under the tension of spring 111 to effect a stretching of the grid strip during the "hot stretch" operation.

Referring particularly to Figs. 32 to 35 it will be seen that there is provided a lead screw gear box 100 which may be generally similar to the ratchet gear box 60 in that it comprises two sections, one section of which is hinged to the other and the box thus formed is fixedly supported on the machine bed 1. Mounted within the box is a gear train and a bearing for the lead screw 90. The gear train includes a relatively large lead screw gear 101 (see Figs. 33 and 34) carried upon the end of a spindle 102 which in turn is journaled in roller bearings 103 mounted in the gear box 100. The drive shaft 70 extends into the gear box 100 and has mounted on the end thereof a driving gear 104, the latter meshing with a pair of intermediate gears 105 and 106. The gear 106 is part of a linkage construction comprising a slotted link member 107 pivoted at one and movable at the other end in an arcuate race 108. By means of a bolt 109 the link 107 is held in an adjusted position and a quick change of gears may be effected by loosening the bolt 109 and substituting the desired intermediate gears 105 and 106 required for a given number of lateral turns of the wire per grid length. Meshing with the lead screw gear 101 and secured to the same stud as gear 106 is a spur gear 110. By means of this gear system the speed of the lead screw 90 may be regulated so that the turns per inch (t. p. i.) of the grid wire may be controlled.

Intermediate the ratchet gear box assembly and the lead screw gear box assembly is a variable pitch cam assembly which may be referred to generally by the numeral 115 (see Figs. 19 and 22 for example). The function of this cam assembly is to provide for loose turns on the grid wire at spaced intervals on the grid strip and also for variations in the pitch of the lateral windings comprising a single grid.

As explained previously the head end of the cam shaft 69, by a proper selection of gears, causes the cam shaft 69 to be driven at a preselected speed. On the end of the cam shaft 69 is mounted a bevelled gear 116 which meshes at right angles with another similar gear 117. The gear 117 is carried by a cam structure including cams 118 and 119. These cams are supported by a stud shaft 120 rotatively mounted in the arms of a bracket member 121. The surface of the cam 118 is adapted to engage the shaft 54, heretofore mentioned, while the surface of the cam 119 engages a shaft 123, each of said shafts carrying at its extremity a cam roller 124 and 125 respectively; (see Fig. 23).

The cam 119 through its control of the shaft 123 actuates suitable mechanism hereinafter described whereby the lead screw 99 is effected to change the formation of the winding, i. e., the pitch between the individual grids on the grid strip and also for variations in the pitch of the lateral windings comprising a single individual grid.

The spindle 82 carries a grid clamp 130 at its left hand end or the end remote from the gear box 100. The grid clamp is illustrated in Figs. 2, 19 and 25 and comprises a pair of pivoted jaws 131 having a manually controlled handle 132 which is capable of being manipulated to grasp the ends of the supporting wires 10 when the spindle has been manually moved to the left and to release the ends of the supporting wires after the spindle has been automatically moved to the right hand position and the grid strip has been completed. The grid clamp for reasons hereinafter apparent is insulated from the spindle 82.

During the winding of the grid strip, mechanical strains are set up in the support wires which should be relieved and for this purpose a "hot stretch" assembly is provided (see in particular Figs. 24, 25 and 46). In the machines of the prior art, hot stretching was an operation performed on a separate device by the operative and it required that the severed grid strip have its ends suitably clamped under tension and while thus clamped an electric current was passed through the strip heating it to a red or incipient glow. At the proper time, the operative disconnected the current and the grid strip was removed from the device. The combination of an assembly of this character as an integral part of the present machine is an important feature thereof.

The hot stretch assembly illustrated and described in its essential aspects comprises a hand lever 135 supported upon a suitable bracket mounted on the machine bed 1 so that the lever 135 is within convenient reach of the operative. The hand lever 135 is pivoted at 136 on a pin mounted in a block 137 which is fast to the shaft 123 which carries the cam roller 125. The pin 136 also carries a cam 138 which in the normal position as shown in Fig. 24 engages a pin 139 carried by a shaft 140. The shaft 140 has a sliding engagement with the block 137 and a strong spring 141 is interposed between the block and a collar or other suitable stop 142 affixed to the shaft 140. When the pin 139 is on the high part of the cam as shown in Fig. 24 the shafts 123 and 140 are held in abutting relation to each other against the pressure of the spring 141 and lateral movement between the two shafts will be prevented when the cam roller 125 engages the variable pitch cam 119.

The shaft 140 has a bearing in the lead screw gear box 100 and adjacent the gear box 100 has an arm 143 attached thereto. The free end of the arm 143 has a bearing 144 for the lead screw 99 and longitudinal movement of the arm and its shaft 140 will permit of longitudinal movement of the lead screw 99 to vary the pitch of the winding. The bearing 144 of the arm 143 fits over a sleeve 145 in the lead screw gear box 100. The lead screw is secured to this sleeve and the sleeve is splined to another sleeve 146 which is driven by the lead screw gear 101, see Figs. 33 and 34. In this manner the lead screw 99 may be moved longitudinally without interfering with its rotational movement.

When the hand lever 135 is moved forward or to the left as viewed in Fig. 24 the cam 138 is moved in a clockwise direction and the cam roller or pin 139 may enter the depressed portion of the cam permitting the shaft 140 to move to the right under the influence of the spring 111. In the normal position with the cam roller 139 on the high part of the cam the arm 143 holds the lead screw 99 in a position to relieve pressure and restrain the pull of the spring 111 on the lead screw while the grid strip is being wound.

A microswitch operating lever 150, which is pivoted at 151, is held in position by a spring 152. When the hand lever 135 is moved to the left it causes the lever 150 to operate the microswitch 153 permitting current to flow through contact 154, contact arm 155, and the metal disc 157 forming part of the grid clamp 130 which as heretofore stated is insulated from the spindle 82 and lead screw 99, and thence into the grid strip.

A flexible member such as a link chain 158 has one of its ends secured to the hand lever 135 and the other end thereof to a rod 159 which is mounted in a casing 160 which encloses a compression spring 161 which when released by moving the hand lever 135 urges the contact arm 155 toward the disc 157.

By this means the grid strip is suitably heated to relieve all strains produced by the winding operation, and as mentioned above the lead screw 99 under the tension of spring 111 retracts the screw 99 by pulling it towards the lead screw gear box, thus stretching the support wires which straightens the same and overcomes any tendency to warp or twist. As the grid strip is stretching the cam roller 139 is moving into the depressed portion of the cam 138.

A second microswitch operating lever 162 is pivoted on the pin or cam roller 139 and the movement of the cam roller while the grid strip is stretching results in a contact member 163 under the influence of the lever 162 causing the microswitch 164 to function to break the circuit after sufficient heat has been supplied. The microswitch 164 is adjustably mounted so that more or less "hot stretch" may be applied depending upon the materials of which the grid is made and the dimensions of the grid.

After the "hot stretching" has been completed the hand lever 135 is moved back to its midway position as shown in Fig. 2. The hand lever carries a spring pressed pawl 165 which is adapted to engage a ratchet 166 mounted on or formed as part of the block 137.

Figure 46 illustrates a simple wiring diagram showing the microswitches 153 and 164, transformer 167, rheostat 168 and relay 169.

Figure 47 illustrates a grid strip having its intermediate portion broken out and is drawn on a large scale. Grid strips made on the machine of the invention are long in comparison to those made on machines of the prior art. From an inspection of Fig. 47 it will be noted there is a series of closely wound portions 170 alternated with a series of loosely wound portions 171 in which the pitch of the grid wires is varied; i. e., the strands of grid wire are widely separated from each other. The closely wound portions have been inserted into notches in the support wires 10 and peened therein as heretofore described. On the other hand the lengths of the support wire on which the loose windings of the grid wire are made are not notched nor peened.

After the grid strip has been removed from the machine it is cut into short lengths as shown in Fig. 48 to form the individual grids, a cut being effected between each of the finely wound portions. A burn-off assembly hereinafter described severs the grid wire at each end of the closely wound portions. Thus when the grid strip is cut up as above described the loosely wound portions will drop off or may be easily pulled off. These portions being waste product, obviously considerable saving of material is effected by having the loose portions coarsely spaced; also saving in time of the operative is effected.

The variation in pitch, between the loose and tight turns of the grid wire is effected by the following mechanism. The variable pitch cam 119 (see Fig. 19) is geared up to make one revolution for each individual grid. Immediately upon coming to the end of a closely wound section the composite shaft which is made up of the shafts 123 and 140 described in connection with the "hot stretch" assembly are moved to the right or in the direction in which the grid strip is travelling during the winding operation, this operation being effected by the variable speed cam through the shafts 123 and 140 and the arm 143 (see Fig. 24). The rate of speed of the longitudinal movement of the grid strip during the winding of the loose turns is thus accelerated; on the other hand the speed (t. p. i.) at which the grid wire is being wound on the support wires being maintained constant, obviously fewer turns of loose wire are used for a given distance.

The variable pitch cam 119 also permits of variations in the pitch of one or more grid wires at one or more intervals in the individual grid. Such a grid is illustrated in Fig. 49, the normal closely wound turns with the same pitch being illustrated at 175 and the turns with the variable pitch being indicated at 176.

In winding an individual grid with portions having a variable pitch the peening wheel 53 gets out of time with the notching wheel 51. To compensate for this condition, i. e., synchronize them, the cam 118 through the cam roller 124 moves the shaft 54 which in turn moves the bracket 56 carrying the peening wheel 53. By virtue of this construction it is assured the peening wheel will at all times during the winding of variable turns of grid wire in an individual grid be in proper relation to the notching wheel properly to perform its function.

It has been heretofore described how the peening wheel is moved out of engagement with the support wires 10 during the winding of the loose turns. It is also important to have the notching wheel moved away from the support wires 10 during the winding of the loose turns. This is particularly desirable in order to insure the terminals of the individual grid being smooth and unmarred in addition to permitting of the easy removal of the loose turns. The mechanism for adjustably mounting the notching wheel and automatically moving it out of engagement with the supporting wire 10 is particularly illustrated in Figs. 37, 38, 39 and 40.

As heretofore mentioned, the notching wheel 51 is carried by a bifurcated bracket 52. The bracket 52 comprises a pair of ears formed on the under side of a frame member 177. The frame member 177 is movable laterally in relation to a plate 178 which is carried on a short spindle 179 supported for vertical adjustment in a collar 180 which in turn is carried by an arm 181 formed on the headstock 15. Vertical adjustment to compensate for different widths of grid strip is effected through manipulation of the thumb screw 182 and after the proper adjustment of the notching wheel 51 in relation to the grid strip has been attained the spindle 179 is tightened in the collar by a clamp screw 183 passing through suitable ears in the collar. The notching wheel may be adjusted to obtain the proper longitudinal relationship to the peening wheel by moving the collar 180 on the arm 181.

The frame member 177 has another pair of ears 184 secured to it or formed as part thereof and pivoted therein is one end of a link 185, the other end of which is pivoted at 186 to a lever 187. It will be noted the link 185 is of a two part construction having a slot and bolt connection between the two parts to permit of shortening or lengthening the link when adjustments of the notching wheel position are made. The lever 187 is pivoted at 189 to an arm or extension secured to or forming part of the ratchet gear box 60.

The lever 187 carries a cam follower 190 which is held in engagement with the cam 191 by a spring 192. The cam 191 is carried by the cam shaft 69 which as heretofore stated is given one revolution for each complete grid. As the high spot 193 of the cam engages the cam follower 190 it will be apparent the notching wheel 51 is moved to the left as viewed from Fig. 38 and it will thus be out of engagement with the grid strip when the loose wires are being wound and the support wires 10 of the grid strip will not be notched at this time.

As heretofore mentioned an automatic loose wire burn-off attachment forms part of the machine contemplated by the present invention. The burn-off attachment burns or severs the grid wire at the juncture or first strand 197 of each loose winding, and the beginning strand 197 of each tight winding, or at points more particularly indicated by the arrows in Fig. 47. Thus as heretofore stated, after the grid strip has been cut into lengths to form the individual grids as shown in Figs. 48 and 49, the loose winding may be removed with a minimum of effort. The automatic burn-off assembly is particularly illustrated in Figs. 36, 41, 42, 43 and 44.

The burn-off attachment comprises a pair of needles 200 and 201 mounted in ears 202 which are adjustably secured to studs 203 carried by a collar 204. This adjustment permits of the points of the needles being brought closer together or moved further apart when it is desired to change the point of burn-out. The needles are also longitudinally adjustable in relation to the ears 202. This adjustment is effected when the pitch of the grid is changed.

The collar 204 is fast to a short shaft 205 to which is also secured a pinion 206 forming part of a chain of pinions 207, 208 and 209. The pinion 209 is secured on a shaft 210 to which is also attached a gear 211 which meshes with one of the gears 76, or to be more specific, the gear which is attached to the drive shaft 70. The herein arrangement of gears and pinions results in one revolution of the shaft 205, carrying the burn-off needles, for each turn of the grid strip.

The current for burning off or severing the grid wire is momentarily supplied under the influence of microswitch 212 carried by the I-beam 1. A disc 213, having two adjustable cams 214 carried thereon, is secured to the cam shaft 69 which latter is rotated one revolution for each complete individual grid wound on the grid strip. The cams 214 engage the spring finger 215 at the precise time each of the needles 201 and 202 contact the grid strip. This allows the microswitch 212 to momentarily complete an electrical circuit to burn off the grid wire at the end of each tight winding, and at the beginning of each loose winding.

By the use of the terms "beginning" and "end," as applied to the loose turns, is meant the sections where the support wires are not notched and no peening takes place, the turns being loosely wound on a smooth length of the support wires. However, the first strands of the loose turns are burned off just past the end of the previous tight turn, and the second burn-off occurs just ahead of the resumption of the winding of the tight turns. This leaves the two ends of the several grids secured close to the support wires.

For a better understanding of the burn-out operation attention is directed to Fig. 44 which illustrates a wiring diagram for the burn-off attachment. The lead 216 is attached to one terminal of the microswitch 212. From the other terminal of the microswitch the current passes through a lead 217 to a contact strip 218 mounted on an insulated block 219. The contact strip 218 engages the collar 204 and the current then passes through the needles, the grid strip and the grid clamp to ground to complete the circuit. When the circuit is momentarily closed by virtue of the spring finger 215 engaging one of the cams 214 on the disc 213 the grid wire at the beginning or first strand 197 of one of the loose windings 171 (see Fig. 47) is burned off. The microswitch is then instantly opened and the circuit is interrupted. At the end of the loose winding 171 the spring finger 215 engages the other cam 214 at which instant the circuit is again momentarily completed and the end strand 197' of the loose winding is burned off. The approximate location of where these points of burn-off are made is indicated in Fig. 47 by dots on the strands 197 and 197'. As the needles rotate they may pass through a steel wire brush 220 to insure the removal of any oxidation that might occur due to sparking.

When the grid strip has been completed and the spindle 82 has travelled the full length of the lead screw 90, the lead screw lock box 83 engages an arm 225 of a normally open microswitch 226 to close the same and permit current to flow through the lead 227 and energize the solenoid 228. The position of the microswitch 226 may be adjusted to insure an accurate stopping of the machine.

The solenoid is connected by a link 229 with the upper end of a lever 230 which has its lower end pivoted on the I-beam 1. Adjacent the pivot of the lever 230 another link 231 is pivoted thereto and the other end of this link is pivoted to the lower end of the forked member 24 which operates the clutch heretofore described. The clutch may also be controlled manually by a hand lever 232 in order that the operative may throw the clutch out to stop the machine any time it is desired or to start the machine when it has been positioned to start a new grid strip. From the foregoing it will be apparent the clutch is automatically operated to stop the machine upon the completion of a grid strip. After the grid strip has been completed and the machine has been stopped the hand lever 135 is manipulated to cause the "hot stretch" assembly to function as heretofore described.

Means are provided to cut off the grid strip in the region of the mandrel after the machine has been stopped and the grid strip completed and this means also embodies an assembly for automatically bringing the mechanism in the lead screw lock box to a proper position to start the machine for the next operation. This mechanism is illustrated in Figs. 1, 29, 30 and 31.

A lever 235 is pivoted at 236 on a bracket 237 mounted on the under side of the I-beam 1 and this lever carries a foot-treadle 238 at its lower end. One end of a link 239 is pivoted at 240 to the upper end of the lever 235 and the other end of the link is pivoted at 241 to the free end of a short lever 242. The other end of the lever 242 is keyed to a stub shaft 243 on which is mounted one of a pair of cutters 244. The other cutter 244 is mounted on a stub shaft 245 and ears 246 pivoted together at 247 are secured to the stub shafts 243 and 245. A spring 246' holds the cutters 244 in the open or full line position of Fig. 31. Means such as a threaded portion and a lock nut 248 are provided for adjusting the length of the link 239 to insure the proper positioning and functioning of the cutters 244. It is apparent from the foregoing that when the foot-treadle 238 is pushed the cutters will be brought together as in the broken line position of Fig. 31 and the grid strip will be severed. The jaws of the grid clamp under the tension of spring 249' are then opened and the completed grid strip is removed from the machine.

A shaft 250 is mounted in the brackets 237 and 251 carried on the under side and near the rear of the I-beam 1. The shaft 250 has an arm 252 secured to it adjacent the bracket 237 and this arm engages a pin 253 mounted on the upper end of the lever 235. Thus when the foot-treadle is pushed and the lever 235 moved the pin 253 will be moved in a counter-clockwise direction, as viewed in Fig. 31 and by virtue of its engagement with the arm 252 a rotational movement will be imparted the shaft 250.

Secured to the shaft 250 adjacent the bracket 251 is a depending arm 255 which has a slotted connection 256 at its lower end for a link 257. The upper end of the link 257 is pivoted at 258 to a bell crank lever 259 which has one of its arms pivoted at 260 in a bracket 261 carried by the I-beam 1. The other end of the bell crank lever carries a shoe 262 which is adapted at the proper time to engage a roller 263 carried by the lever 96 heretofore mentioned.

As previously described the lever 96 operates the cam 92 which moves the split lock nuts 91 in the lock nut box 83 out of engagement with the lead screw 90 thus releasing the spindle 82 so that it may be manually moved in relation to the lead screw 90. It is thought to be apparent pressure on the treadle 238 will move the parts in Fig. 30 to their broken line position simultaneously with the cutting off of the grid strip. After the jaws of the grid clamp have been opened and the completed grid strip removed the grid clamp and spindle are moved manually toward the left as viewed in Fig. 1 and the grid clamp is tightened on the exposed ends of the support wires projecting from the mandrel. The roller 263 carried on the lever 96 at this time being out of engagement with the shoe 262 the operative throws the lever 95 from its broken line position of Fig. 30 to the full line position; the lock nuts 91 are again brought into engagement with the lead screw 90, and the clutch may be thrown in to start the winding mechanism.

Springs 264 are provided to insure the return of the shoe 262 to its normal or full line position of Fig. 30 when the foot-treadle is released. An arm 265 extending downwardly is adapted to engage the spring finger 266 of a normally closed micro-switch 267. Should the arms 95 and 96 inadvertently or designedly be thrown to their broken line position to release the spindle from the lead screw the switch 267 will function to interrupt the circuit and stop the machine.

At times it may be desirable to increase or decrease the length of the loose windings or in other words increase or decrease the distance between the tight windings so as to have a greater or less amount of support wire exposed to form longer or shorter terminals. For this purpose the peening cam 73 and the notching cam 191 are each formed of two discs as shown in Figs. 37, 38, 39 and 40. One of the discs is provided with an arcuate slot 77 through which a bolt 78 passes and is threaded into the opposing disc. Adjustment is thus provided to increase or decrease the lengths of the high spots or rises on the cams so that the notching member 51 and peening member 53 will be retracted from the support wires for a greater or less distance of their travel and thus increase or decrease the length of the loose windings. Obviously when the foregoing adjustment has been effected, the needles 200 and 201 of the burn-off device are adjusted so that their points are further apart or closer together in accordance with the adjustment made on the notching and peening cams.

Attention is called to Fig. 45 which illustrates a wiring diagram. As heretofore stated the microswitch 226 completes a circuit to energize the solenoid 228 which throws the clutch out after the grid strip has been completed. Lead 270 connects the microswitch 226 with the positive line 271 and lead 272 connects the solenoid 228 with the negative line 273. The microswitch 267 which acts as a safety switch is connected to the leads 270 and 227 by leads 274 and 275. An indicating light 276 is under control of a microswitch 277 connected to the positive line by a lead 278. The lead 279 connects the other terminal of the microswitch 277 to a transformer 280 for the indicating light 276 and the lead 281 connects the transformer to the negative line 273. The microswitch 277 functions to permit of the operation of the indicating light 276 only when the machine has stopped.

A feature of the present machine not heretofore emphasized resides in splitting the head stock 15, i. e., forming it of two main pieces or sections 15a and 15b (see Figs. 17 and 36). By this construction it is a very simple matter to dismantle the head stock for repair purposes or change of parts, thus reducing the time the machine is shut down; also saving the repairman's time as well as avoiding serious loss of the operative's time during the making of repairs.

From the foregoing description it is thought the operation of the machine should be clear. However, a brief résumé of the sequence of work operations which are performed by the main units or assemblies would be helpful.

Assume a completed grid strip has been removed from the machine. At that time the spindle 82 is released from the lead screw 90. The operative grasps the spindle 82 and/or the grid clamp 130 and moves them to the left a sufficient distance for the grid clamp to engage the exposed ends of the support wires 10, projecting just to the right of the peening and notching wheels 51 and 53 respectively. The operative then tightens the grid clamp on the ends of the support wires. The lever 95 on the lock nut box 93 is manually raised to the full line position of Fig. 31 causing the split lock nut 91 to engage the lead screw 90. The operative then manipulates the hand lever 232 to cause the forked member 24 to engage the clutch and start the machine. The rotation of the lead screw will move the spindle and its grid clamp toward the right drawing the supporting wires 10 with it. The spindle, the mandrel and the supporting wire are obviously all rotating in unison, and while thus rotating, grid wire 44 is being wound upon the supporting wires 10. During the course of the travel of the spindle and its grid clamp, the notching and nonotching, the peening and the variable pitch mechanisms are functioning (as heretofore described) in their proper sequence to perform their respective functions.

When the spindle has moved the required distance to complete the grid strip the microswitch 226 automatically effects the energization of the solenoid 228 which opens the clutch as heretofore described and causes the machine to stop. If the "hot stretch" is desired the operative manipulates the hand lever 135 and the "hot stretch" assembly functions as heretofore set forth. The operative then applies pressure on the foot-treadle 238 and the strip is cut off and at the same time the spindle is released from the lead screw. The operative then manually opens the jaws of the grid clamp, removes the completed grid strip and the cycle of operation is again repeated.

Numerous changes in details of construction and arrangements of parts such as would occur to one skilled in the art are to be considered as coming within the spirit of the invention as expressed in the appended claims.

We claim:

1. In a machine for winding grids, a bed and a plurality of units mounted thereon, said units including a spool assembly rotatively mounted and carrying spools of support wire, a head stock assembly including a notching member and a peening member, a mandrel rotatively mounted for facilitating the notching and peening operations, a grid wire assembly including means for feeding a grid wire from a spool to said support wires between said notching member and said peening member, a lead screw assembly including a lead screw and a spindle therefor, means for locking said spindle to said lead screw, a ratchet mechanism, a lead screw gear box assembly, a drive shaft common to said ratchet mechanism and said lead screw gear box assembly for driving said mechanisms in timed relation, a variable pitch cam assembly interposed between said ratchet mechanism and said lead screw gear box assembly, a variable speed motor drive, a clutch interposed between said motor and said drive shaft, a grid clamp assembly for connecting the free end of said support wires to said lead screw spindle, and a grid strip cut-off assembly including a cutter.

2. In a machine for winding grids, a bed and a plurality of units mounted thereon, said units including a spool drum assembly carrying a cradle rotatively mounted with respect to the machine bed and having spools of support wires disposed within the cradle, a head stock assembly including a notching member and a peening member, a mandrel rotatively mounted for facilitating the notching and peening operations, a grid wire feed assembly including a reel of wire and a system of guides and idler members for unreeling the wire and feeding it to the mandrel over said support wires and between the notching member and peening member, a lead screw assembly including a lead screw and a spindle therefor, means for locking said spindle to said lead screw, a ratchet mechanism, a lead screw gear box assembly, a drive shaft common to said ratchet mechanism and said lead screw gear box assembly for driving said mechanisms in timed relation, a variable pitch cam assembly interposed between said ratchet mechanism and said lead screw gear box assembly, a variable speed motor drive, a clutch interposed between said motor and said drive shaft, a grid clamp assembly for connecting the free end of said support wires to said lead screw spindle, and a grid strip cut-off assembly including a cutter.

3. In a machine for winding grids, a bed and a plurality of units mounted thereon, said units including a spool assembly rotatively mounted and carrying spools of support wire, a head stock assembly including a notching member and a peening member, a mandrel rotatively mounted for facilitating the notching and peening operations, a grid wire assembly including means for feeding a grid wire from a spool to said support wires between said notching member and said peening member, a lead screw assembly including a lead screw and a spindle therefor, a mechanism for locking the spindle to the lead screw, a ratchet mechanism including a set of quick change gears and a plurality of pawls for operating same, a lead screw gear box assembly including a set of quick change gears, a variable pitch cam assembly interposed between the lead screw gear box and the ratchet mechanism, a drive shaft common to said ratchet mechanism and the lead screw gear box mechanism for driving said mechanisms in timed relation, a variable speed motor drive, a clutch interposed between said motor and said drive shaft, a grid clamp assembly for connecting the free end of said support wires to said lead screw spindle, and a grid strip cut-off assembly including a cutter.

4. In a machine for winding grids, a bed and a plurality of units mounted thereon, said units including a spool drum assembly carrying a cradle rotatively mounted with respect to the machine bed and having spools of support wires disposed within the cradle, a head stock assembly including a notching member and a peening member, a mandrel rotatively mounted for facilitating the notching and peening operations, a grid wire feed assembly including a reel of wire and a system of guides and idler members for unreeling the wire and feeding it to the mandrel and between the notching member and peening member, a lead screw assembly including a lead screw and a spindle therefor, a mechanism for locking the spindle to the lead screw, a ratchet mechanism including a set of quick change gears and a plurality of pawls for operating same, a lead screw gear box assembly including a set of quick change gears, a variable pitch cam assembly interposed between the lead screw gear box and the ratchet mechanism, a drive shaft common to said ratchet mechanism and the lead screw gear box mechanism for driving said mechanisms in timed relation, a variable speed motor drive, a clutch interposed between said motor and said drive shaft, a grid clamp assembly for connecting the free end of said support wires to said lead screw spindle, and a grid strip cut-off including a cutter.

5. In a machine for winding grids, a bed and a plurality of units mounted thereon, said units including a spool drum assembly carrying a cradle rotatively mounted with respect to the machine bed and having spools of support wires disposed within the cradle, a head stock assembly including a notching member and a peening member, a mandrel rotatively mounted facilitating the notching and peening operations, a grid wire feed assembly including a reel of wire and a system of guides and idler members for unreeling the wire and feeding it to the mandrel over said support wires and between the notching member and peening member, means whereby said notching member and said peening member may be moved away from said mandrel and said support wires at regular intervals during the winding of the grid wire, a lead screw assembly including a lead screw and a spindle therefor, means for locking said spindle to said lead screw, a ratchet mechanism, a lead screw gear box assembly, a drive shaft common to said ratchet mechanism and said lead screw gear box assembly for driving said mechanisms in timed relation, a variable pitch cam assembly interposed between said ratchet mechanism and said lead gear box assembly, a variable speed motor drive, a clutch interposed between said motor and said drive shaft, a grid clamp assembly for connecting the free end of said support wires to said lead screw spindle, and a grid strip cut-off assembly including a cutter.

6. In a machine for winding grids, a bed and a plurality of units mounted thereon, said units including a spool drum assembly carrying a cradle rotatively mounted with respect to the machine bed and having spools of support wires disposed within the cradle, a head stock assembly including a notching member and a peening member, a mandrel rotatively mounted for facilitating the notching and peening operations, a grid wire feed assembly including a reel of wire and a system of guides and idler members for unreeling the wire and feeding it to the mandrel over said support wires and between the notching member and peening member, means whereby said notching member and said peening member may be moved away from said mandrel and said support wires at regular intervals during the winding of the grid wire, a lead screw assembly including a lead screw and a spindle therefor, means for locking said spindle to said lead screw, a ratchet mechanism, a lead screw gear box assembly, a drive shaft common to said ratchet mechanism and said lead screw gear box assembly for driving said mechanisms in timed relation, a variable pitch cam assembly interposed between said ratchet mechanism and said lead screw gear box assembly, a burn-off assembly including means for burning and severing the grid wires at regular intervals, a variable speed motor drive, a clutch interposed between said motor and said drive shaft, a grid clamp assembly for connecting the free end of said support wires to said lead screw spindle, and a grid strip cut-off assembly including a cutter.

7. In a machine for winding grids, a bed and a plurality of units mounted thereon, said units including a spool drum assembly carrying a cradle rotatively mounted with respect to the machine bed and having spools of support wires disposed within the cradle, a head stock assembly including a notching member and a peening member, a mandrel rotatively mounted for facilitating the notching and peening operations, a grid wire feed assembly including a reel of wire and a system of guides and idler members for unreeling the wire and feeding it to the mandrel over said support wires and between the notching member and peening member, means whereby said notching member and said peening member may be moved away from said mandrel and said support wires at regular intervals during the winding of the grid wire, a lead screw assembly including a lead screw and a spindle therefor, means for locking said spindle to said lead screw, a ratchet mechanism, a lead screw gear box assembly, a drive shaft common to said ratchet mechanism and said lead screw gear box assembly for driving said mechanisms in timed relation, a variable pitch cam assembly interposed between said ratchet mechanism and said lead screw gear box assembly, a hot-stretch assembly including means for manually starting its operation and automatic means controlled by the amount of stretch for stopping its operation, a variable speed motor drive, a clutch interposed between said motor and said drive shaft, a grid clamp assembly for connecting the free end of said support wires to said lead screw spindle, and a grid strip cut-off assembly including a cutter.

8. In a machine for winding grid strips having a plurality of finely wound portions separated by loosely wound portions, a bed and a plurality of units mounted thereon, said units including a spool drum assembly carrying a cradle rotatively mounted with respect to the machine bed and having spools of support wire disposed within the cradle, a head stock including a notching member and a peening member, a mandrel rotatively mounted for facilitating the notching and peening operations, a grid wire feed assembly including a reel of wire and a system of guides and idler members for unreeling the wire and feeding it to the mandrel over said support wires and between the notching member and the peening member, means whereby said notching member and said peening member may be moved away from said mandrel and said support wires during the winding of loosely wound portions of the grid strip, a lead screw assembly including a lead screw and a spindle therefor, a mechanism for locking the spindle to the lead screw, a ratchet mechanism including a set of quick change gears and pawls for operating same, a lead screw box assembly including a set of quick change gears, a variable pitch cam assembly interposed between the lead screw gear box and the ratchet mechanism for controlling the pitch of the finely wound and loosely wound portion of the grid strip, a drive shaft common to said ratchet mechanism and the lead screw gear box mechanism for driving said mechanisms in timed relation, a variable speed motor drive, a clutch interposed between said motor and said drive shaft, a grid clamp assembly for connecting the free end of said support wires to said lead screw spindle, and a grid strip cut-off assembly including a cutter.

9. In a machine for winding grid strips having a plurality of finely wound portions separated by loosely wound portions, a bed and a plurality of units mounted thereon, said units including a spool drum assembly carrying a cradle rotatively mounted with respect to the machine bed and having spools of support wire disposed within the cradle, a head stock including a notching member and a peening member, a mandrel rotatively mounted for facilitating the notching and peening operations, a grid wire feed assembly including a reel of wire and a system of guides and idler members for unreeling the wire and feeding it to the mandrel over said support wires and between the notching member and the peening member, means whereby said notching member and said peening member may be moved away from said mandrel and said support wires during the winding of loosely wound portions of the grid strips, a lead screw assembly including a lead screw and a spindle therefor, a mechanism for locking the spindle to the lead screw, a ratchet mechanism including a set of quick change gears and pawls for operating same, a lead screw box assembly including a set of quick change gears, a variable pitch cam assembly interposed between the lead screw gear box and the ratchet mechanism and including a pair of cams one of which controls variable pitch in the finely wound portions and the pitch in the loosely wound portions of the grid strip, and the other of which properly positions the peening member while winding variable pitch wires in the finely wound portions of the grid strip, a drive shaft common to said ratchet mechanism and the lead screw gear box mechanism for driving said mechanisms in timed relation, a variable speed motor drive, a clutch interposed between said motor and said drive shaft, a grid clamp assembly for connecting the free end of said support wires to said lead screw spindle, and a grid strip cut-off assembly including a cutter.

10. In a machine for winding grids, a bed and a plurality of units mounted thereon, said units including a spool assembly rotatively mounted and carrying spools of support wire, a head stock assembly including a notching member and a peening member, a mandrel rotatively mounted for facilitating the peening operations, a grid wire assembly including means for feeding a grid wire from a spool to said support wires between said notching member and said peening members, a lead screw assembly including a lead screw and a spindle therefor, means for locking said spindle to said lead screw, a ratchet mechanism, a lead screw gear box assembly, a drive shaft common to said ratchet mechanism and said lead screw gear box assembly for driving said mechanisms in timed relation, a variable pitch cam assembly interposed between said ratchet mechanism and said lead screw gear box assembly, a variable speed motor drive, a clutch interposed between said motor and said drive shaft, a grid clamp assembly for connecting the free end of said support wires to said lead screw spindle, a grid strip cut-off assembly including a cutter, a foot treadle, linkage between said foot treadle and said cutter for operating said cutter, and linkage between said foot treadle and said means for locking said spindle to said lead screw to release said spindle from said lead screw simultaneously with the operation of said cutter.

11. In a machine for winding grid strips having a plurality of finely wound portions separated by loosely wound portions, a bed and a plurality of units mounted thereon, said units including a spool drum assembly carrying a cradle rotatively mounted with respect to the machine bed and having spools of support wire disposed within the cradle, a head stock including a notching member and a peening member, a mandrel rotatively mounted for facilitating the notching and peening operations, a grid wire feed assembly including a reel of wire and a system of guides and idler members for unreeling the wire and feeding it to the mandrel over said support wires and between the notching member and the peening member, means whereby said notching member and said peening member may be moved away from said mandrel and said support wires during the winding of loosely wound portions of the grid strip, a lead screw assembly including a lead screw and a spindle therefor, a mechanism for locking the spindle to the lead screw, a ratchet mechanism including a set of quick change gears and pawls for operating same, a lead screw box assembly including a set of quick change gears, a variable pitch cam assembly interposed between the lead screw gear box and the ratchet mechanism for controlling the pitch of the finely wound and loosely wound portions of the grid strip, a cam shaft driven by one of said quick change gears in said ratchet mechanism, said cam shaft carrying the cams for moving said notching member and said peening member away from said mandrel and said support wires during the winding of the loosely wound portions of the grid strip and said cam shaft driving the variable pitch cam assembly, a drive shaft common to said ratchet mechanism and the lead screw gear box mechanism for driving said mechanisms in timed relation, a variable speed motor drive, a clutch interposed between said motor and said drive shaft, a grid clamp assembly for connecting the free end of said support wires to said lead screw spindle, and a grid strip cut-off assembly including a cutter.

12. In a machine for winding grids, a hot stretch assembly including a hand lever the movement of which operates a switch to close an electrical circuit to cause current to pass through the completed grid strip, a cam movable by said hand lever, a cam roller so positioned that it may move into a depressed portion of said cam after said hand lever has been manipulated, an adjustable spring urging the lead screw, lead screw spindle and grid clamp away from the grid strip to stretch the heated grid strip, the movement of the cam roller into the depressed portion of the cam permitting the spring to function and causing a lever to operate a switch to open the electrical circuit after the grid strip has been stretched the proper amount.

13. In a machine for winding grids as set forth in claim 12, a flexible member having one end connected to the hand lever and the other end to a rod carrying a contact arm and spring urged toward the grid clamp.

14. In a machine for winding grids as set forth in claim 5, means for varying the length of the intervals at which the notching member and peening member are moved away from the mandrel and support wires.

15. In a machine for winding grids as set forth in claim 11, means for varying the length of the intervals at which the notching member and peening member are moved away from the mandrel and support wires.

16. In a machine for winding grids as set forth in claim 11, the length of the depressed portions and high spots of said cams for moving said notching member and said peening member away from said mandrel and said support wires being adjustable so as to vary the ratio of the lengths of the finely wound portions and the loosely wound portions of the grid strip.

17. In a machine for winding grid strips having tight and loose windings thereon, a burn-off assembly including a pair of needles, means for causing one of said needles to engage the grid strip at the beginning of a loose winding, means for causing the other of said needles to engage the grid strip at the end of the loose winding thereon, and means for causing an electric current to be passed through said needles and said grid strip only at the moment of contact.

18. In a machine for winding grid strips having tight and loose windings thereon as set forth in claim 17, the means to cause the needles to engage the grid strip at the beginning and ending of the loose windings being operated by a chain of gears driven from a gear on the drive shaft of the machine.

19. In a machine for winding grid strips having tight and loose windings thereon as set forth in claim 17, the means for causing an electric current to be passed through said needles and said grid strip being controlled by switches operable by a cam mounted on the cam shaft of the machine.

20. In a machine for winding grid strips having tight and loose windings thereon as set forth in claim 17, means whereby the ends of the needles may be moved closer together or further apart from each other.

21. In a machine for winding grid strips having tight and loose windings thereon as set forth in claim 17, means whereby the needles may be adjusted longitudinally in relation to the grid strip.

22. In a machine for winding grid strips having tight and loose windings thereon as set forth in claim 17, means whereby the needle may be adjusted longitudinally in relation to the grid strip.

23. In a machine for winding grids, a switch automatically operated by a moving part of the machine when a grid strip has been completed, a solenoid in circuit with said switch, a link operable by said solenoid, a pivoted lever to which the free end of said link is connected, a second link pivoted to said lever, a clutch operating lever pivoted to the other end of said second mentioned link, a clutch, the operation of which will stop the machine through the aforesaid linkage when the grid strip is completed and the solenoid is energized, and manually controlled means interposed in said linkage to operate said clutch.

24. In a machine for winding grids, a pair of pivoted jaws for cutting off a completed grid strip, a foot treadle for operating said jaws, a shaft rotated by movement of said foot treadle, linkage between said shaft and the means for locking the lead screw spindle of the machine to the lead screw, the arrangement being such that the operation of said foot treadle will simultaneously sever said completed grid strip and release said means for locking the lead screw spindle to the lead screw.

25. In a machine for winding grids, a pair of pivoted jaws for cutting off a completed grid strip, a link connecting said jaws to a lever pivoted on the bed of the machine, a foot treadle on the lower end of said lever, a shaft rotated by movement of said lever, another lever secured to said shaft, linkage between said second mentioned lever and the means for locking the lead screw spindle of the machine to the lead screw, the arrangement being such that the operation of said foot treadle will simultaneously sever said completed grid strip and release said means for locking the lead screw spindle to the lead screw.

26. In a machine for winding grids, a pair of pivoted jaws for cutting off a completed grid strip, a link connecting said jaws to a lever pivoted on the bed of the machine, a foot treadle on the lower end of said lever, a shaft rotated by movement of said lever, another lever secured to said shaft, a link connecting said second mentioned lever to a bell crank lever, a shoe on the upper end of one of the arms of said bell crank lever, the shoe engaging a lever extending from the means for locking the lead screw spindle of the machine to the lead screw, the arrangement being such that the operation of the foot treadle will simultaneously sever said completed grip strip and move said shoe to cause said lever from lead screw locking means to release the locking means.

27. In a machine for winding grids, a tail stock assembly including a head member in which a lead screw spindle is journaled, a lead screw mounted within said spindle, a lead screw nut assembly for connecting the lead screw with the spindle so that longitudinal movement of the spindle in one direction will be effected by rotation of the lead screw and when the lead screw nut assembly is released the spindle may be moved freely in relation to the lead screw, said lead screw nut assembly being supported by two floating side bearings on oppositely disposed stationary shafts; said lead screw spindle carrying a grid clamp assembly at one end which is adapted to be manually moved in one direction to grip the ends of the grid support wires, and automatically moved in the reverse direction to pull the grid support wires past a grid wire winding assembly; a grid strip cutoff assembly including a cutter for cutting off a completed grid strip; and means for simultaneously operating the cutoff assembly and releasing the lead screw nut assembly.

28. In a machine for winding grids, a head stock assembly including bearings in which a spindle for guiding support wires from a spool drum assembly is rotatively mounted, said spindle having longitudinal grooves to accommodate the support wires and carrying a driving pulley and a clutch, a mandrel secured in the end of said spindle, the cross-section of said mandrel determining the configuration of the grid being wound, and a notching member and a peening member supported in operative relationship to said support wires above and below said mandrel and in staggered relation to each other; said peening member being carried on a pivoted arm, and means for moving said arm and said peening member axially so that said peening member is moved away from its operative relationship with said support wires.

29. In a machine for winding grid strips having tight and loose windings thereon, a burn-off assembly including a pair of needles, means for causing one of said needles to engage the grid strip at the beginning of a loose winding, means for causing the other of said needles to engage the grid strip at the end of the loose winding thereon, and means for causing an electric current to be passed through said needles and said grid strip only at the moment of contact; a chain of gears driven from a gear on the drive shaft of the machine to cause the needles to engage the grid strip at the beginning and ending of the loose windings; and means for causing an electric current to be passed through said needles and said grid strip, the last-mentioned means including switches operated by a cam mounted on the cam shaft of the machine.

30. In a machine for winding grids, a lead screw nut assembly including a housing, a pair of stationary shafts on which said housing is adapted to slide, a pair of split lock nuts mounted in said housing, spring means urging said split lock nuts into engagement with the lead screw of the machine to lock the lead screw to the lead screw spindle, and means to release said lock nuts when a grid strip has been completed; said releasing means comprising a disc having cam slots therein to engage pins carried by said lock nuts; said disc having a lever extending therefrom; a shoe engaging said lever when the grid strip is completed; said shoe being operable by and simultaneously with the grid strip cutoff mechanism; and a second lever carried by said disc for manually controlling the position of the lock nuts.

GERHARD GUNTHER SCHNEIDER.
FRANK L. DONOHUE.

REFERENCES CITED

The following references are of record in the file of this patent:

UNITED STATES PATENTS

| Number | Name | Date |
| --- | --- | --- |
| 844,541 | Schellenbach | Feb. 19, 1907 |
| 1,002,455 | Rosenstein | Sept. 5, 1911 |
| 1,585,905 | Madden et al. | May 25, 1926 |
| 1,814,770 | Schenk et al. | July 14, 1931 |
| 1,874,575 | Morick et al. | Aug. 30, 1932 |
| 1,897,460 | Anderson et al. | Feb. 14, 1933 |
| 1,970,599 | Franke | Aug. 21, 1934 |
| 1,994,307 | Flaws, Jr. | Mar. 12, 1935 |
| 2,181,288 | Washburn | Nov. 28, 1939 |
| 2,188,906 | Lackey | Feb. 6, 1940 |
| 2,237,466 | Zimmermann | Apr. 8, 1941 |